(12) United States Patent
Sun et al.

(10) Patent No.: US 10,519,799 B2
(45) Date of Patent: Dec. 31, 2019

(54) SYSTEMS AND METHODS FOR A VARIABLE GEOMETRY TURBINE NOZZLE

(71) Applicant: Ford Global Technologies, LLC, Dearborn, MI (US)

(72) Inventors: Harold Huimin Sun, West Bloomfield, MI (US); Ben Zhao, Beijing (CN); Leon Hu, Bloomfield Hills, MI (US); Jianwen James Yi, West Bloomfiled, MI (US); Eric Warren Curtis, Milan, MI (US); Jizhong Zhang, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 15/828,681

(22) Filed: Dec. 1, 2017

(65) Prior Publication Data

US 2018/0087453 A1   Mar. 29, 2018

Related U.S. Application Data

(62) Division of application No. 14/709,339, filed on May 11, 2015, now Pat. No. 9,890,700.

(60) Provisional application No. 62/082,899, filed on Nov. 21, 2014.

(51) Int. Cl.
*F01D 17/16* (2006.01)

(52) U.S. Cl.
CPC ........ *F01D 17/165* (2013.01); *F05D 2210/30* (2013.01); *F05D 2220/40* (2013.01); *F05D 2240/12* (2013.01); *Y02T 10/144* (2013.01)

(58) Field of Classification Search
CPC ........ F02B 37/24; F02B 39/00; F01D 17/165; F01D 5/141; F05D 2210/30; F05D 2220/40; F05D 2240/12; Y02T 10/144
See application file for complete search history.

(56) References Cited

U.S. PATENT DOCUMENTS

| 4,355,953 | A | 10/1982 | Nelson |
| 7,255,530 | B2 | 8/2007 | Vogiatzis et al. |
| 7,458,764 | B2 | 12/2008 | Lombard et al. |
| 8,919,119 | B2 | 12/2014 | Sun et al. |
| 9,267,427 | B2 | 2/2016 | Sun et al. |
| 2013/0042608 | A1 | 2/2013 | Sun et al. |
| 2014/0360160 | A1 | 12/2014 | Sun et al. |
| 2018/0119609 | A1* | 5/2018 | Ehrhard ................ F01D 17/165 |

* cited by examiner

*Primary Examiner* — Richard A Edgar
(74) *Attorney, Agent, or Firm* — Geoffrey Brumbaugh; McCoy Russell LLP

(57) ABSTRACT

Various systems and methods are described for a variable geometry turbine. In one example, a nozzle vane includes a stationary having a first cambered sliding surface and a sliding vane having a second cambered sliding surface where the second cambered sliding surface includes a flow disrupting feature in contact with the first sliding cambered surface. The sliding vane may be positioned to slide in a direction from substantially tangent along a curved path to an inner circumference of the turbine nozzle and selectively uncover the flow disrupting feature.

5 Claims, 11 Drawing Sheets

SYSTEMS AND METHODS FOR A VARIABLE GEOMETRY TURBINE NOZZLE

CROSS REFERENCE TO RELATED APPLICATIONS

The present application is a divisional of U.S. patent application Ser. No. 14/703,339, entitled "SYSTEMS AND METHODS FOR A VARIABLE GEOMETRY TURBINE NOZZLE," filed on May 11, 2015. U.S. patent application Ser. No. 14/703,339 claims priority to U.S. Provisional Patent Application No. 62/082,899, "SYSTEMS AND METHODS FOR A VARIABLE GEOMETRY TURBINE NOZZLE," filed on Nov. 21, 2014. The entire contents of the above-reference applications are hereby incorporated by reference in their entirety for all purposes.

FIELD

The present application relates to variable geometry turbines for turbochargers of internal combustion engines.

BACKGROUND AND SUMMARY

Engines may use a turbocharger to improve engine torque and/or power output density. A turbocharger may include a turbine disposed in line with the engine's exhaust stream, and coupled via a drive shaft to a compressor disposed in line with the engine's intake air passage. The exhaust-driven turbine may then supply energy, via the drive shaft, to the compressor to boost the intake air pressure. In this way, the exhaust-driven turbine supplies energy to the compressor to boost the pressure and flow of air into the engine. Therefore, increasing the rotational speed of the turbine may increase boost pressure. The desired amount of boost may vary over operation of the engine. For example, the desired boost may be greater during acceleration than during deceleration.

One solution to control the boost pressure is the use of a variable geometry turbine in the turbocharger. A variable geometry turbine controls boost pressure by varying the flow of exhaust gas through the turbine. For example, exhaust gas may flow from the exhaust manifold through a turbine nozzle and to the turbine blades. The geometry of the turbine nozzle may be varied to control the angle that exhaust gas contacts the turbine blades and/or to vary the cross-sectional area of inlet passages, or throat, upstream of the turbine blades. Increasing the cross-sectional area of the inlet passages may allow more gas to flow through the passages. Furthermore, the angle of incidence of gas flowing across the turbine blades may affect the efficiency of the turbine, e.g., the amount of thermodynamic energy captured from the flow that is converted to mechanical energy. Thus, the turbine speed and boost pressure may be varied by changing the geometry of the turbine nozzle.

The design of variable geometry turbines has been modified to yield various desirable results. For example, U.S. Patent Application 2013/0042608 by Sun et al. discloses systems and methods to vary the angle of incidence of gas flowing across the turbine blade by adjusting the cross-sectional area of the passages between adjacent nozzle vanes. Herein, an annular turbine nozzle is provided having a central axis and a number of nozzle vanes. Each nozzle vane comprises a stationary vane and a sliding vane, wherein the sliding vane includes a planar surface in sliding contact with a planar surface of the stationary vane. As such, the nozzle vane may enable a desired angle of incidence and a preferred cross-sectional area of the passages over a range of engine operating conditions.

The inventors herein have recognized potential issues with the approach identified above. For example, the sliding vane(s) may intrude at a high flow area of the inlet passages. In this way, intrusion of leading edges of the sliding vanes may create sub-optimal angles of incidence for the incoming gas and thereby lead to increased aerodynamic flow loss. Moreover, the sliding vane traveling on the planar surface may slide a relatively large distance in the radial direction into the high flow area of the inlet passage, thereby leading to packaging challenges.

Further, the above methods and systems do not address potential shock waves generated during certain engine operating conditions, such as engine braking. During engine braking, the exhaust stream may be constricted, and therefore, shock waves may be generated, leading to strong interaction and excitation on the turbine blades. The shock wave-induced excitation, also referred to as forced response excitation or fluid structure interaction, may be a source of fatigue on the turbine blades and a limiting factor of further increasing exhaust braking power of turbocharged engines.

The inventors herein have recognized the above issues and developed an approach to at least partly address the above issues. As one example, an annular turbine nozzle may be provided, comprising a nozzle vane including a stationary vane attached to a surface of a nozzle wall plate and including a first sliding surface, and a sliding vane including a second sliding surface including a flow disrupting feature in contact with the first sliding surface, the sliding vane positioned to slide in a direction from substantially tangent to an inner circumference of the turbine nozzle and selectively uncovering the flow disrupting feature. In this way, the surface treatment may be exposed during various conditions, such as engine braking, to reduce the intensity of possible shock waves and excitation on the turbine blades.

For example, the first sliding surface of the stationary vane and the second sliding surface of the sliding vane may be cambered surfaces, such that the sliding vane may be positioned to slide along a curved line matching the cambered surfaces of the first sliding surface and the second sliding surface. As such, the sliding vane slides on a curved path defined by a curvature, or cambered line, of the first sliding surface and the second sliding surface. Thus, a desired angle of incidence may be substantially maintained while simultaneously reducing a radial displacement traveled by the sliding vane during various engine operating conditions. In this way, exhaust gas expansion losses may be reduced as compared to a sliding vane and stationary vane having planar sliding surfaces.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

DETAILED DESCRIPTION

Figure 1:
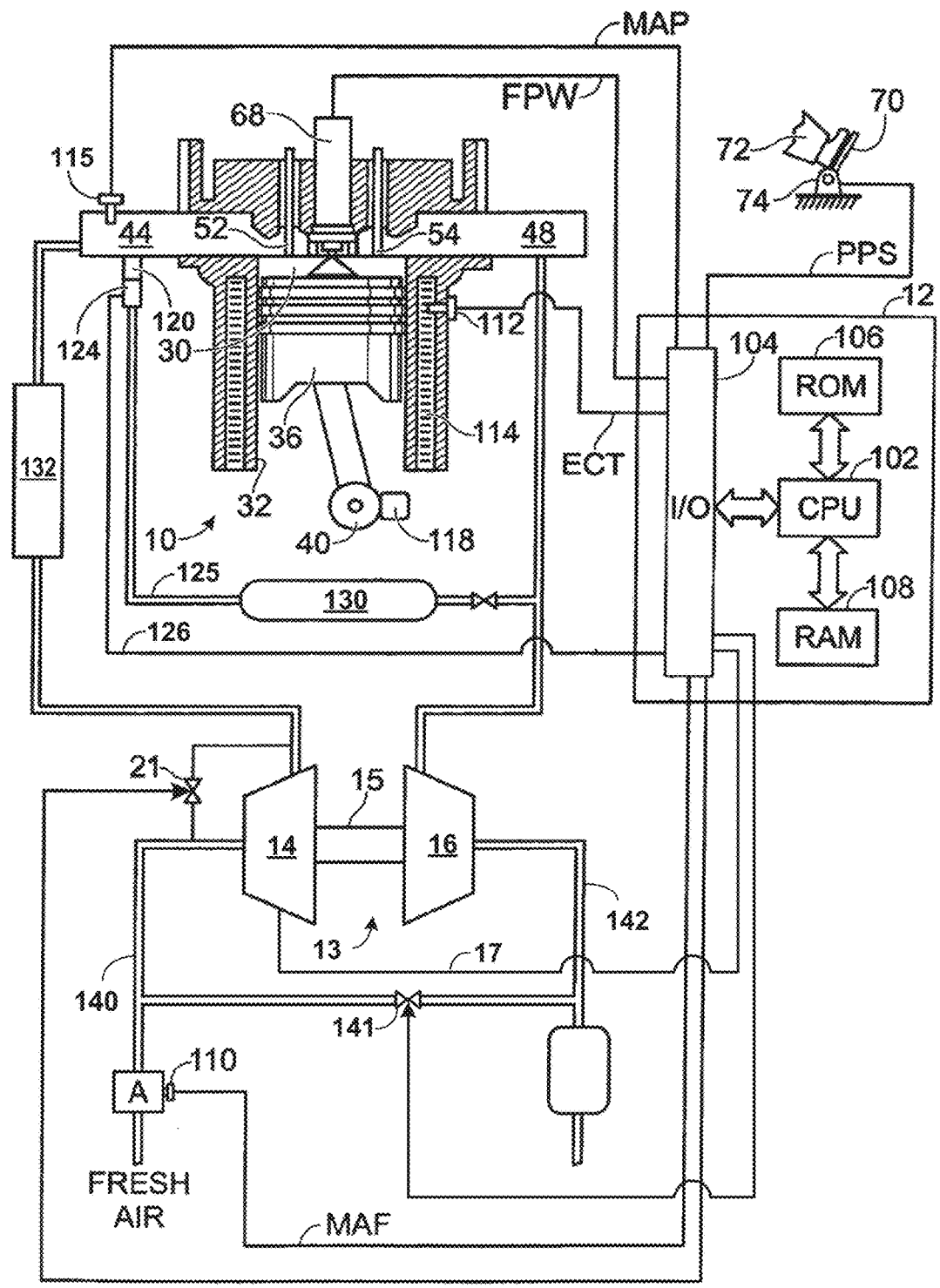
FIG. 1 shows an example embodiment of a turbocharged engine.
Figure 3:
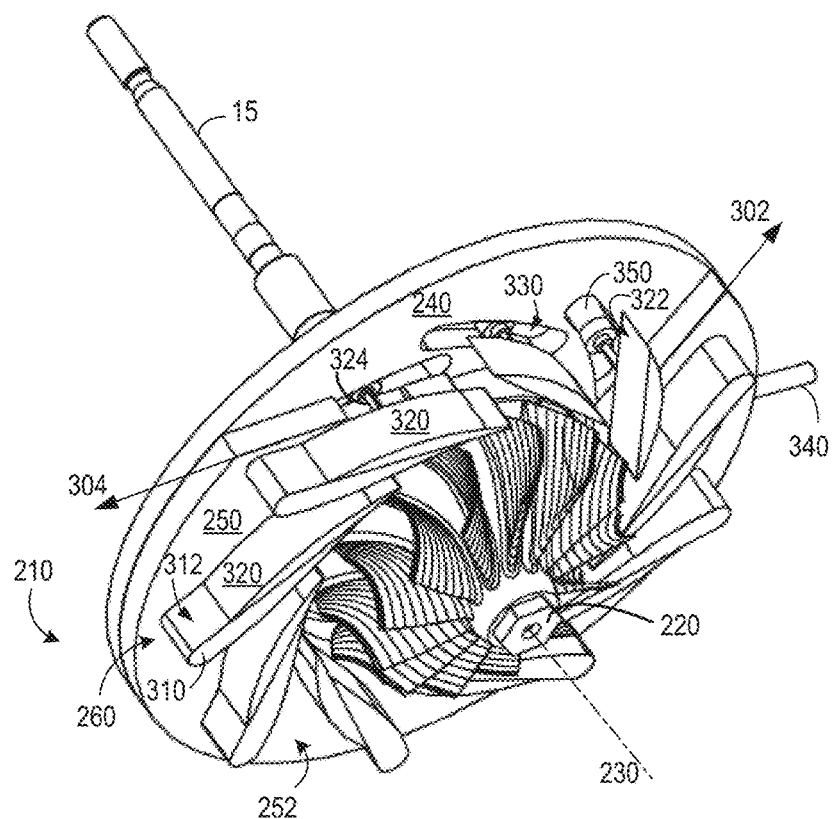
FIG. 3 illustrates a perspective view of an example embodiment of a turbine nozzle and a turbine wheel.
Figure 4:
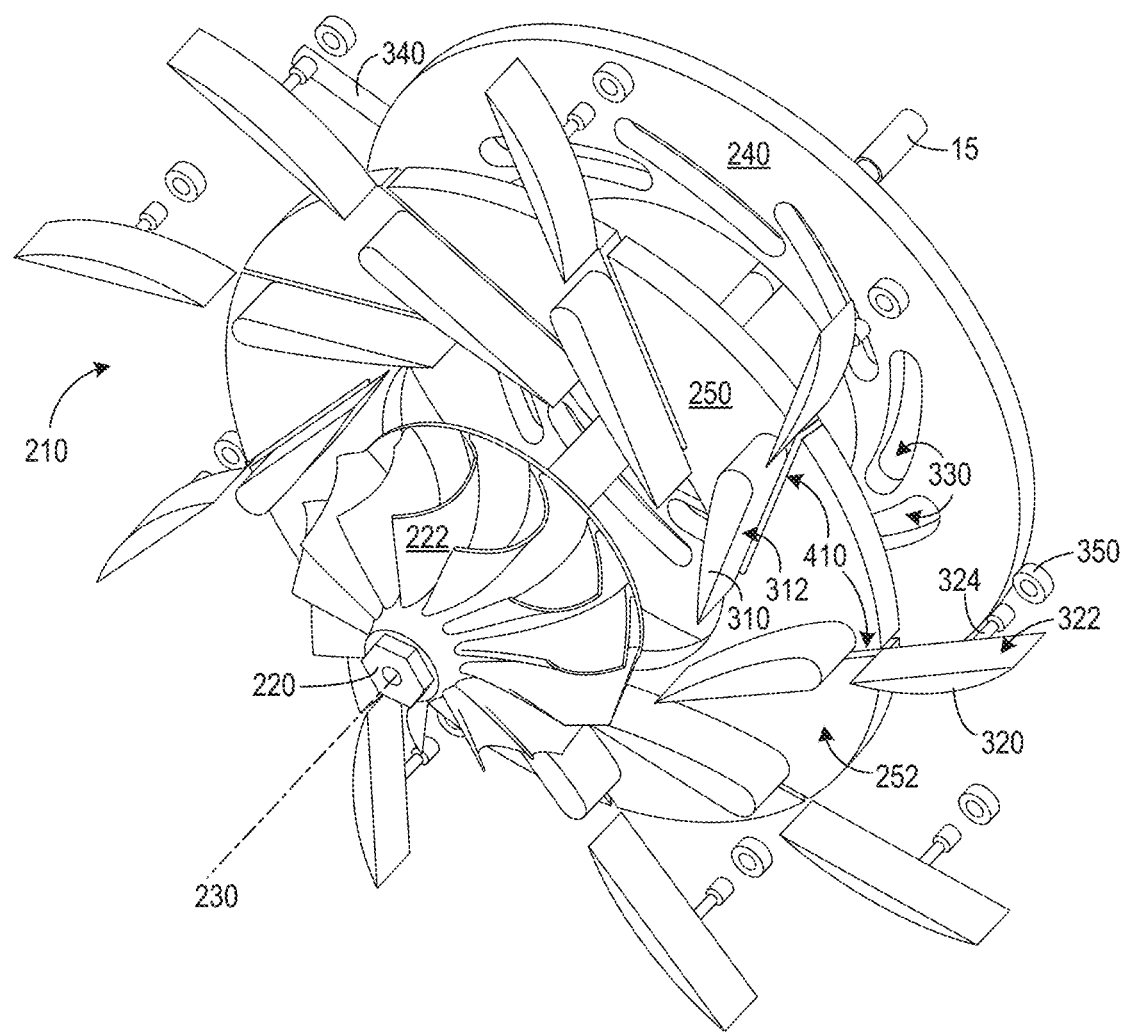
FIG. 4 portrays a magnified view of an example embodiment of a turbine nozzle.
Figure 6:
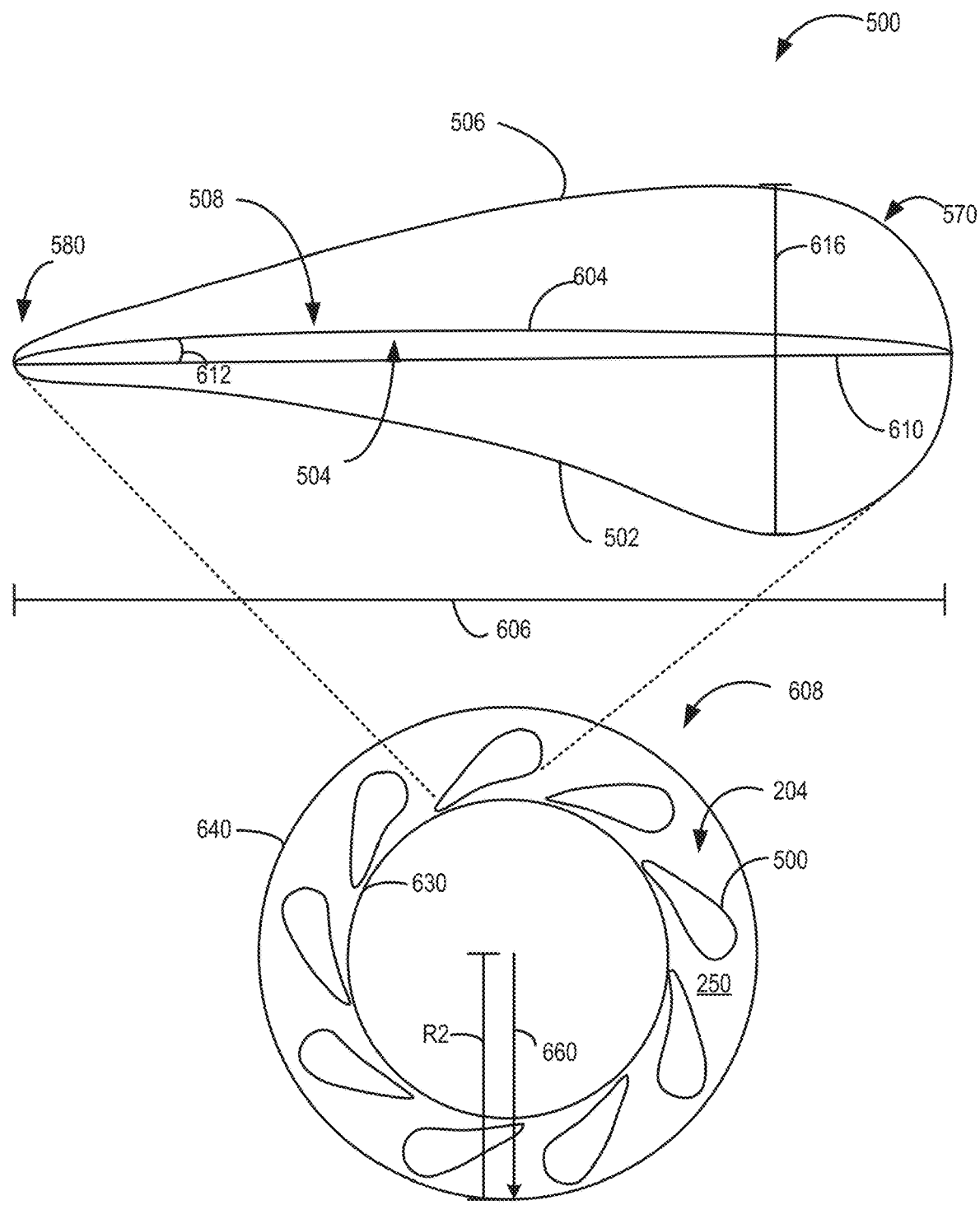
FIG. 6 shows an example turbine nozzle having a nozzle vane of a desirable thickness to chord length ratio.
Figure 7:
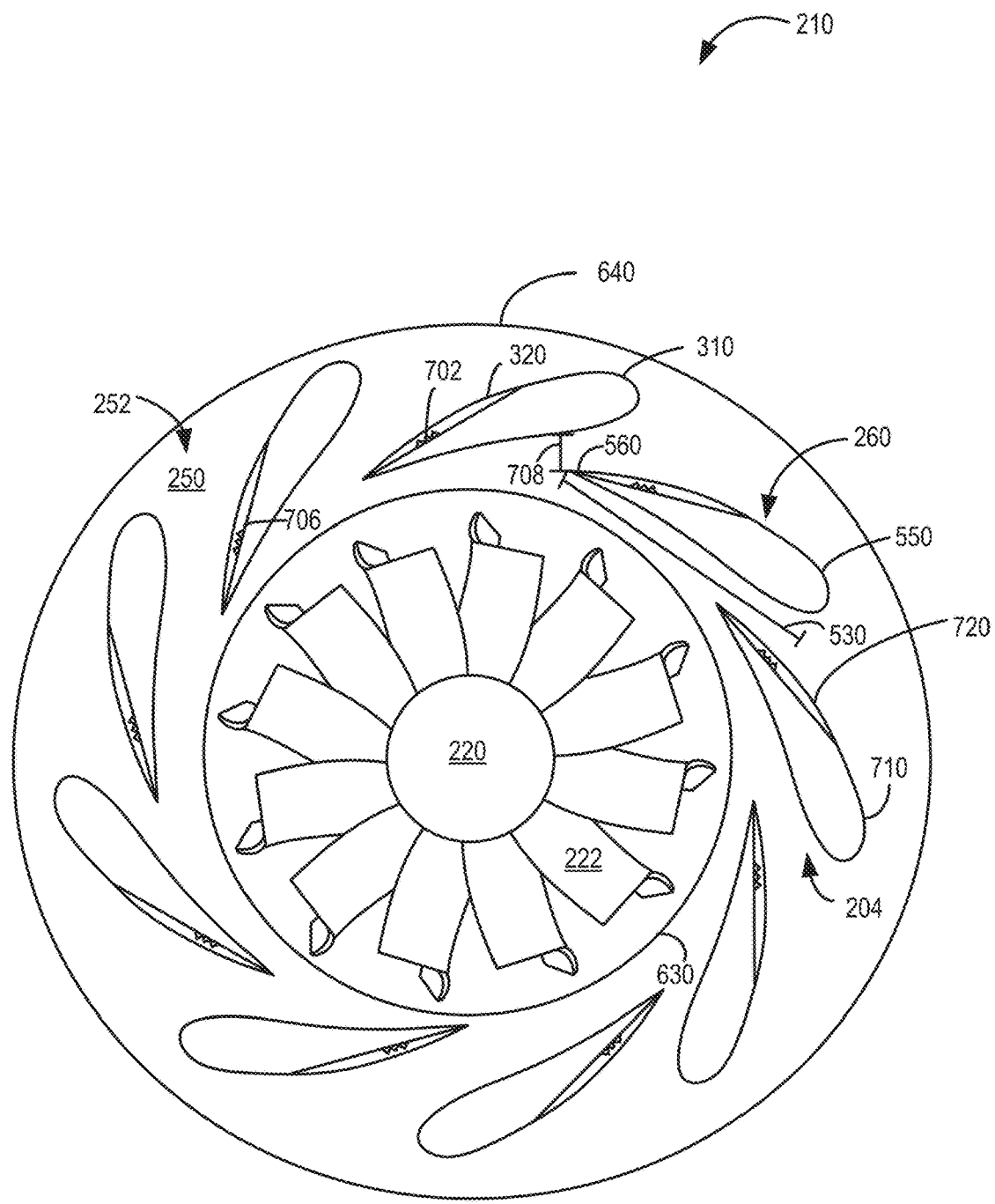
FIG. 7 shows an example turbine nozzle having nozzle vanes with flow disrupting features.
Figure 10:
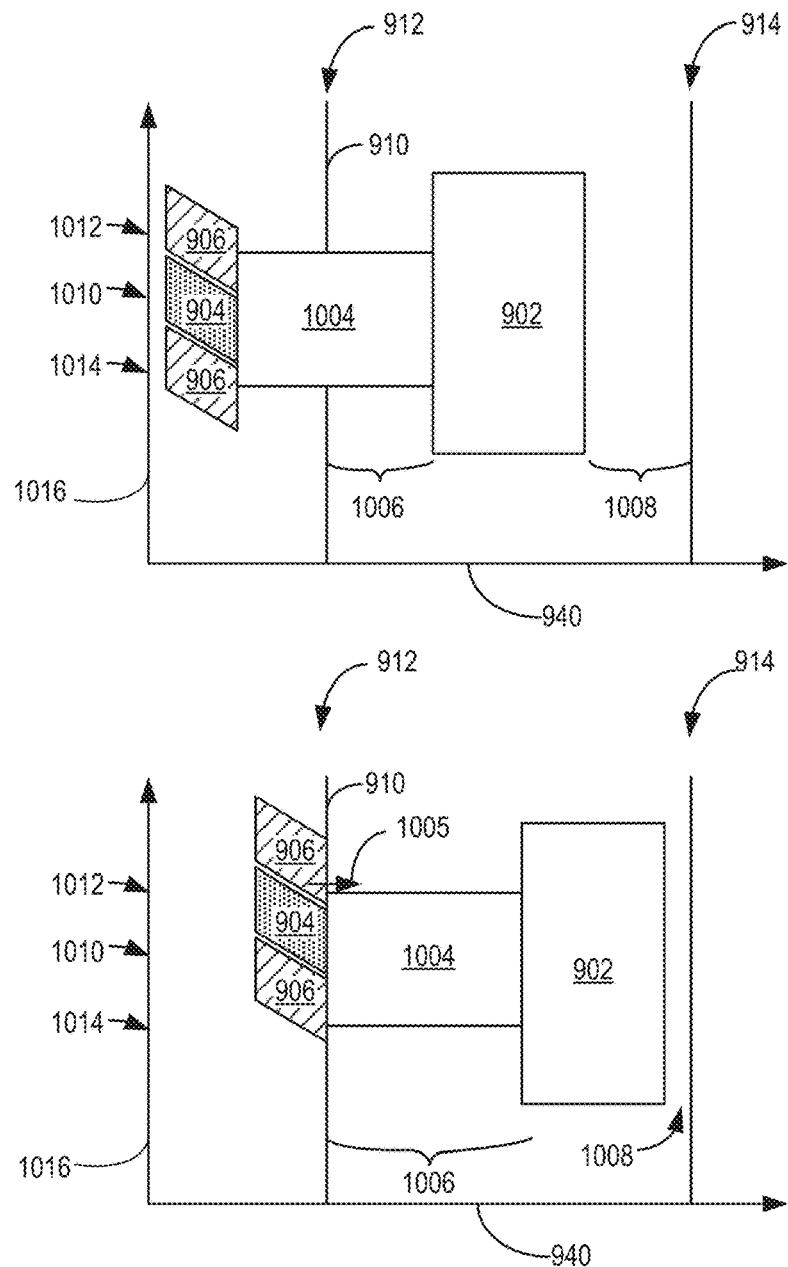
FIG. 10 illustrates a side schematic view of the example turbine nozzle of FIG. 9.
Figure 11:
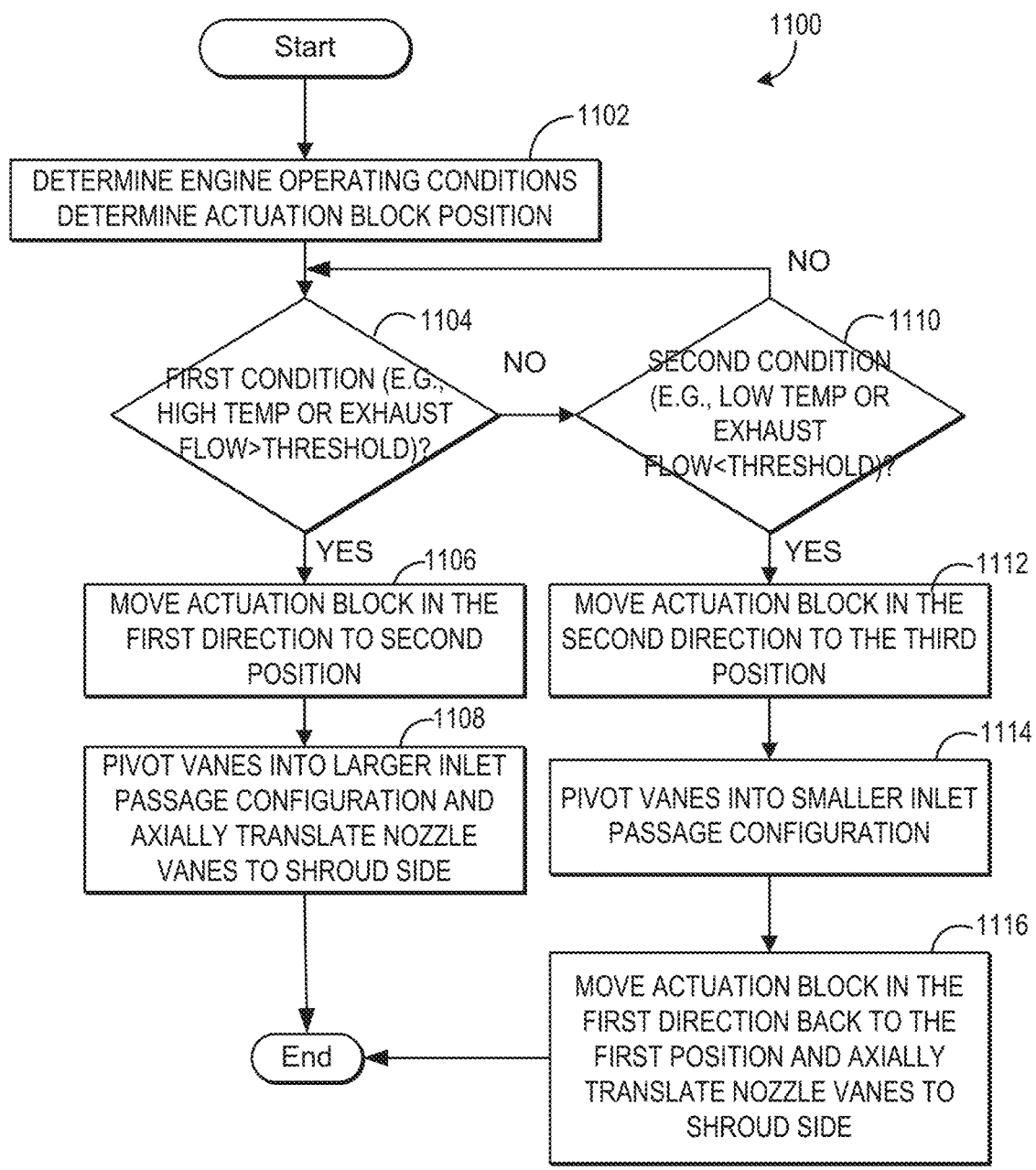
FIG. 11 shows an example method for a turbocharged engine including a turbine nozzle with swing vane turbine nozzle.

The following description relates to systems and methods for variable geometry turbochargers of internal combustion engines. An example engine with a turbocharger is illustrated in FIG. 1. The example turbocharger includes a compressor driven by a turbine, such as the turbine illustrated in FIG. 2. The turbine may include a turbine nozzle and a turbine wheel, such as shown in more detail in FIGS. 3-8. FIG. 3 shows a perspective view of an example embodiment of a turbine nozzle and a turbine wheel. Similarly, FIG. 4 shows a perspective view of an example embodiment of the turbine nozzle having nozzle vanes. In one example, each nozzle vane may include a stationary vane and a sliding vane having flat sliding surfaces, as shown on the top image of FIG. 5. In another example, each nozzle vane may include a stationary vane and a sliding vane having cambered (e.g., curved) sliding surfaces, as shown on the bottom image of FIG. 5. Further, the nozzle vane having a stationary vane and sliding vane may comprise a desired chord geometry (FIG. 6). In one embodiment, the turbine nozzle may include a plurality of nozzle vanes, wherein the plurality of nozzle vanes may each include a flow disrupting surface, or a surface treatment, to reduce shock-induced excitation on the turbine blades, as shown in FIG. 7. In another embodiment, the sliding vanes may each move to cover and/or uncover the flow disrupting surface on the turbine nozzle (FIG. 8). In yet another embodiment, a swing vane turbine nozzle may be provided, wherein the nozzle vanes may comprise a conventional actuation block (top right of FIG. 9) and/or an actuation block having altered geometry (bottom right of FIG. 9). Each of the conventional and/or altered geometry actuation block may rotate, swing, or pivot one or more nozzle vanes. FIG. 10 shows a side view of the schematic illustration of the altered geometry actuation block of FIG. 9. Further, a plurality of nozzle vanes in a swing vane turbine nozzle may be adjusted by one or more actuation blocks of FIGS. 9 and 10 for a turbocharged engine (FIG. 11).

FIG. 1 shows an example of a turbocharged engine. Specifically, internal combustion engine 10, comprising a plurality of cylinders, one cylinder of which is shown in FIG. 1. Engine 10 may be controlled at least partially by a control system including controller 12 and by input from a vehicle operator 72 via an input device 70. In this example, input device 70 includes an accelerator pedal and a pedal position sensor 74 for generating a proportional pedal position signal PPS. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

Controller 12 is shown in FIG. 1 as a microcomputer, including microprocessor 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 115; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Further, controller 12 may estimate a compression ratio of the engine based on measurements from a pressure transducer positioned in the cylinder 30 (not shown).

The controller 12 receives signals from the various sensors of FIG. 1 and employs the various actuators of FIG. 1 to adjust engine operation based on the received signals and instructions stored on a memory of the controller.

Storage medium read-only memory 106 can be programmed with computer readable data representing instructions executable by processor 102 for performing the methods.

In a configuration known as high pressure EGR, exhaust gas is delivered to intake manifold 44 by EGR tube 125 communicating with exhaust manifold 48. EGR valve assembly 120 is located in EGR tube 125. Stated another way, exhaust gas travels from exhaust manifold 48 first through valve assembly 120, then to intake manifold 44. EGR valve assembly 120 can then be said to be located upstream of the intake manifold. There is also an optional EGR cooler 130 placed in EGR tube 125 to cool EGR before entering the intake manifold. Low pressure EGR may be used for recirculating exhaust gas from downstream of turbine 16 to upstream of compressor 14 via valve 141.

Pressure sensor 115 provides a measurement of manifold pressure (MAP) to controller 12. EGR valve assembly 120 has a valve position (not shown) for controlling a variable area restriction in EGR tube 125, which thereby controls EGR flow. EGR valve assembly 120 can either minimally restrict EGR flow through tube 125 or completely restrict EGR flow through tube 125, or operate to variably restrict EGR flow. Vacuum regulator 124 is coupled to EGR valve assembly 120. Vacuum regulator 124 receives actuation signal 126 from controller 12 for controlling valve position of EGR valve assembly 120. In one embodiment, EGR valve assembly is a vacuum actuated valve. However, any type of flow control valve may be used, such as, for example, an electrical solenoid powered valve or a stepper motor powered valve.

Turbocharger 13 has a turbine 16 coupled to exhaust manifold 48 and a compressor 14 coupled in the intake manifold 44 via an intercooler 132. Turbine 16 is coupled to compressor 14 via a drive shaft 15. Air at atmospheric pressure enters compressor 14 from passage 140. Exhaust gas flows from exhaust manifold 48, through turbine 16, and exits passage 142. In this manner, the exhaust-driven turbine supplies energy to the compressor to boost the pressure and flow of air into the engine. The boost pressure may be controlled by the rotational speed of turbine 16 which is at least partially controlled by the flow of gasses through turbine 16.

Figure 2:
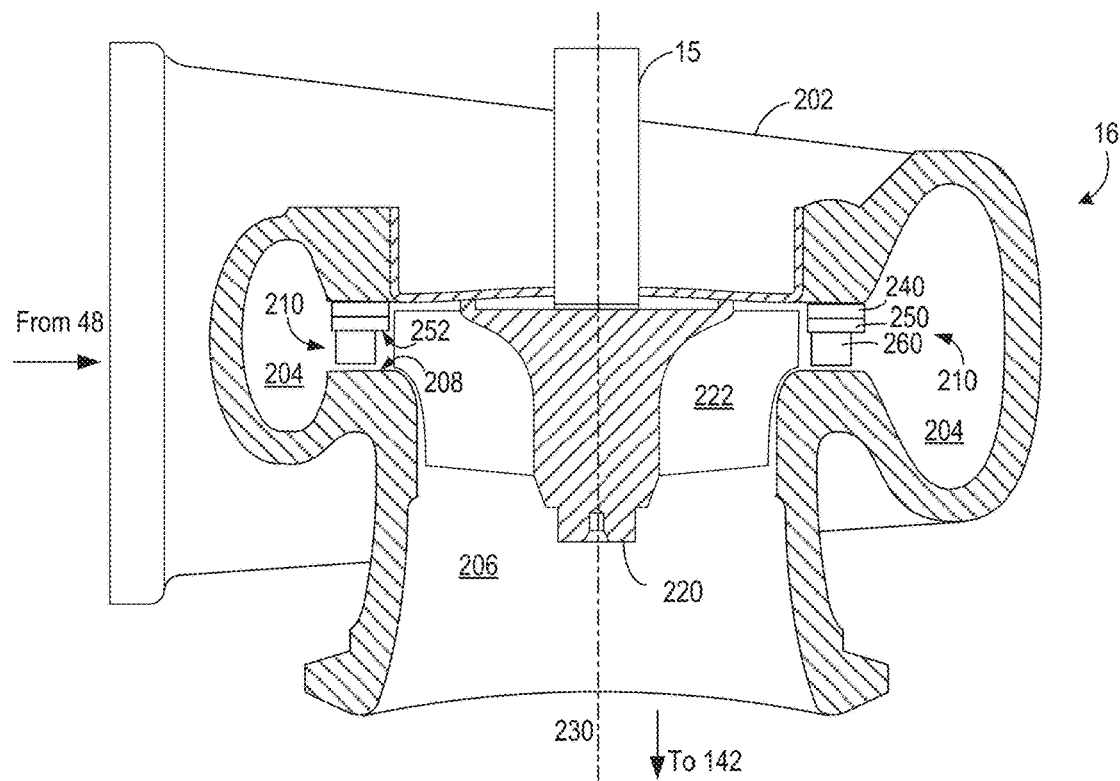
FIG. 2 shows a cross-section of an example embodiment of a turbocharger turbine including a turbine nozzle.

The flow of exhaust gases through turbine 16 may be further illustrated by the example embodiment of turbine 16 in FIG. 2. Turbine 16 may include a volute or housing 202 that encloses a turbine nozzle 210 and a turbine wheel 220 having turbine blades 222. For example, housing 202 may include an inlet passage 204 in communication with turbine nozzle 210. Turbine nozzle 210 may be in communication with inlet passage 204. Thus, exhaust gas may flow from exhaust manifold 48, through inlet passage 204, through turbine nozzle 210, across turbine wheel 220 and turbine blades 222 into passage 206, and out to passage 142. Further, the flow of exhaust gases, e.g. the expansion of gases, through turbine 16 may be controlled by varying the geometry of turbine nozzle 210, and thus, the rotational speed of turbine 16 may be controlled.

In one embodiment, turbine nozzle 210 may be generally annular and share a central axis 230 with turbine wheel 220 and drive shaft 15. In other words, turbine wheel 220 and turbine nozzle 210 may be coaxial and concentric. Turbine nozzle 210 may include an annular unison ring 240, an annular nozzle wall plate 250, and one or more nozzle vanes 260. In one embodiment, unison ring 240 and nozzle wall plate 250 may form a support and control structure for nozzle vane 260. As such, in one example, the shape of nozzle vane 260 may be adjusted by rotating one or both of unison ring 240 and nozzle wall plate 250.

A geometry of each nozzle vane 260 may be adjusted to control the flow of gases through turbine nozzle 210. For example, in a split sliding nozzle vane turbine (SSVNT), a length of nozzle vane 260 may be adjusted to control the flow of gases through turbine nozzle 210. In this example, a sliding vane of the nozzle vane 260 may slide in a direction tangentially from an outer circumference of the nozzle wall plate 250. The aforementioned arrangement may be herein referred to as a conventional sliding vane embodiment.

In another embodiment contrasting the conventional sliding vane embodiment, a sliding vane of the nozzle vane 260 may slide back into and out from a recess or well (as shown in reference to FIG. 8) over a range of engine operating conditions. More specifically, the sliding vane of the nozzle vane 260 may slide axially into the nozzle wall plate 250, for example, in a direction parallel to the central axis 230 rather than tangentially from the outer circumference of the nozzle wall plate 250.

In yet another embodiment, a swing or pivot nozzle vane turbine may be provided in place of the SSVNT. Nozzle vanes 260 of a swing or pivot nozzle vane turbine may pivot around an axis parallel with the central axis 230. The swing or pivot nozzle vane turbine, as shown below in reference to FIGS. 9-11, may vary the flow of exhaust gas through turbine 16 by controlling an angle at which exhaust gas strikes the turbine blades 222. Additionally, the swing nozzle vane turbine may vary the flow of exhaust gas through turbine 16 by controlling a cross-sectional area of inlet passages 204 between nozzle vanes 260 upstream from the turbine blades 222 through which the exhaust flow passes. As such, nozzle vanes 260 may be configured to pivot in one direction to increase the cross-sectional area of inlet passages 204 upstream of the turbine 16, thereby decreasing an angle of incidence of gas flowing across the turbine blades 222. The nozzle vanes 260 may also be configured to pivot in the opposite direction to decreases the cross-sectional area of inlet passages 204 to the turbine wheel. As a result, the angle of incidence of exhaust gas flowing across the turbine blades 222 may be increased.

Regardless of a type of turbine nozzle described above, varying the geometry of nozzle vane 260 and/or the orientation of the nozzle vane 260 may vary the cross-sectional area of the inlet passages 204 of turbine nozzle 210. In one embodiment, the inlet passage 204 may include four sides. For example, a first side of the inlet passage 204 may be formed by a surface 252 of nozzle wall plate 250 and a second side of the inlet passage 204 may be formed by a surface 208 of turbine housing 202. The third side and fourth side may each be formed by a surface of adjacent nozzle vanes. As such, lengthening nozzle vane 260 may adjust the cross-sectional area of inlet passages 204 of turbine nozzle 210 and the volumetric flow of gas through inlet passages 204.

In another embodiment, axial movement of one or both of nozzle wall plate 250 and turbine housing 202 may further be used to vary the cross-sectional area of the inlet passages 204 of turbine nozzle 210. For example, a distance between nozzle wall plate 250 and turbine housing 202 may be varied during certain engine operating conditions, such that the nozzle wall plate 250 may be moved for the distance relative to turbine housing 202. Thus, the cross-sectional area of the inlet passages 204 of the turbine nozzle 210 of a swing nozzle type turbine may also be controlled by varying additional turbine components.

The geometry and adjustment of nozzle vane 260 may be further illustrated in FIG. 3. FIG. 3 shows a perspective view of an example sliding vane turbine nozzle 210 and turbine wheel 220, where part of nozzle wall plate 250 is cut-away, e.g., removed, for illustration purposes at cut-lines 302 and 304. Thus, details of unison ring 240 that are covered by nozzle wall plate 250 in an assembled turbine nozzle 210 are shown in FIG. 3. Turbine nozzle 210, unison ring 240, and nozzle wall plate 250 may be generally annular or ring shaped with an inner circumference and an outer circumference. In one embodiment, turbine nozzle 210, unison ring 240, and nozzle wall plate 250 are coaxial. Further, inner circumferences of turbine nozzle 210, unison ring 240, and nozzle wall plate 250 may be the same. In one embodiment, the outer circumferences of turbine nozzle 210, unison ring 240, and nozzle wall plate 250 may be the same.

Nozzle vane 260 may include a stationary vane 310 and a sliding vane 320. In one embodiment, the length of nozzle vane 260 may be adjusted by moving (e.g., sliding) one or both of the stationary vane 310 and sliding vane 320 relative to each other. For example, sliding vane 320 may be configured to move and stationary vane 310 may be attached to or integral to nozzle wall plate 250. Attachment of stationary vane 310 to nozzle wall plate 250 may reduce clearance between stationary vane 310 and nozzle wall plate 250. In this way, aerodynamic losses may be reduced when exhaust gases flow past stationary vane 310. Stationary vane 310 may include a sliding surface 312 in sliding contact with a sliding surface 322 of sliding vane 320. In one embodiment, sliding surface 312 and sliding surface 322 may be substantially perpendicular to surface 252 of nozzle wall plate 250. For example, the angle between each of sliding surface 312 and sliding surface 322, and surface 252 may be 90 degrees. In another example, the angle between each of sliding surface 312 and sliding surface 322, and surface 252 may be between 80 and 100 degrees. Therefore, sliding surfaces 312 and 322 may be parallel and planar.

In another embodiment, sliding surface 312 of stationary vane 310 and sliding surface 322 of sliding vane 320 may be cambered (e.g., curved), and not planar. As such, sliding surface 312 of the stationary vane 310 and sliding surface 322 of sliding vane 320 may be substantially complementary to one another. For example, sliding surface 322 of the sliding vane 320 may be convex and sliding surface 312 of the stationary vane 310 may be correspondingly concave, as shown in below in reference to FIG. 5. Sliding surface 322 may be positioned to slide along a curved tangential path matching the same cambered surfaces of the sliding surfaces 312 and 322. In an example, the sliding vane 320 slides on a curved path defined by a curvature of the first sliding surface (e.g., sliding surface 312 of stationary vane 310) and the second sliding surface (e.g., sliding surface 322 of sliding vane 320).

In this embodiment, extension or elongation of the nozzle vane 260 along cambered sliding surfaces 312 and 322 may reduce a radial displacement of the sliding vane 320 during low exhaust flow conditions (e.g., during light or low engine load, low engine speed, and/or low engine temperature) compared to extension or elongation of a nozzle vane having flat and planar sliding surfaces. As such, packaging burdens may be reduced due to the decreased spatial displacement of the cambered sliding surfaces, as discussed below in reference to FIG. 5.

In one embodiment, sliding vane 320 may be positioned to move or slide as unison ring 240 is rotated. For example, unison ring 240 may be rotated via an actuation arm 340 extending in a radial direction from unison ring 240. Unison ring 240 may include a slot 330 shaped to receive and direct the position of a bearing 350. Bearing 350 may be configured to receive an actuation pin 324 of sliding vane 320. For example, actuation pin 324 may extend from sliding vane 320 through a slot in nozzle wall plate 250 to be received by bearing 350. Thus, sliding vane 320 may be constrained to move within a range determined by the length and position of the slot in nozzle wall plate 250 and the length and position of slot 330.

In an alternative embodiment, sliding vane 320 may be positioned to move as unison ring 240 is rotated via an actuator output shaft (not shown), which is linked to a stirrup member (not shown). The stirrup member may engage with axially extending guide rods (not shown) that support the nozzle ring. As such, the actuator output shaft, driven by a pneumatic, electric, and/or or mechanical mechanism, may enable the turbine nozzle to be moved. It will be appreciated that details of the nozzle ring mounting and guide arrangements may differ from those illustrated.

Turning now to FIG. 4, an exploded view of an example turbine nozzle is shown, which may further illustrate components of turbine nozzle 210, including slot 410 in nozzle wall plate 250. In one embodiment, slot 410 may extend to the outer circumference of nozzle wall plate 250. When turbine nozzle 210 is assembled, slot 410 of nozzle wall plate 250 and slot 330 of unison ring 240 may cross.

Actuation pin 324 may extend from sliding vane 320 through nozzle wall plate 250 and unison ring 240 at the cross-point of slots 330 and 410. When unison ring 240 is rotated in a first direction relative to nozzle wall plate 250 about central axis 230, the cross-point may move outward toward the outer circumference of nozzle wall plate 250. Similarly, when unison ring 240 is rotated in an opposite, second direction relative to nozzle wall plate 250, the cross-point may move inward toward the inner circumference of nozzle wall plate 250. Thus, the position of sliding vane 320 may be adjusted by rotating unison ring 240. For example, in one embodiment, the sliding surface 322 of sliding vane 320 may be moved in a curved radial direction on turbine nozzle 210 along sliding surface 312. In another embodiment, sliding vane 320 may be moved in a curved direction without pivoting.

The sliding of sliding vane 320 as described above during various engine operating conditions may control the flow of exhaust gas traveling through turbine nozzle 210. In this way, boost pressure of intake manifold 44 may be controlled. Specifically, the flow of exhaust gas through turbine nozzle 210 may be controlled by adjusting a length of nozzle vane 260, which may vary the cross-sectional area of inlet passages 204 of turbine nozzle 210.

Exhaust gas flowing through turbine nozzle 210 may include soot and hydrocarbons that may be deposited on sliding surfaces 312 and 322. The deposits may cause increased resistance, or sticking, when sliding vane 320 slides upon and against stationary vane 310. Thus, it may be desirable to reduce the soot and hydrocarbon deposits on sliding surfaces 312 and 322 during operation of the engine. In one example, the sliding motion of sliding surface 322 against sliding surface 312 may be used to remove the deposits.

As such, in one embodiment, stationary vane 310 may be made of a first material and sliding vane 320 may be made of a different, second material. Further, the first material and/or second material may be abrasive. For example, stationary vane 310 may be ceramic or ceramic-coated, and sliding vane 320 may be steel. As another example, stationary vane 310 may be steel, and sliding vane 320 may be ceramic or ceramic-coated. Further, one or both of sliding surfaces 312 and 322 may include a texture. For example, a coarse texture on sliding surface 312 of the stationary vane 310 may reduce the surface area in contact with sliding surface 322. As such, the course texture on sliding surface 312 of stationary vane 310 may reduce resistance when the sliding vane 320 is moving or sliding in contact with stationary vane 310. Additionally or alternatively, sliding surface 322 of sliding vane 320 may also have a coarse texture or pattern, thus further reducing resistance when the sliding vane 320 is moving or sliding against and in contact with stationary vane 310. In this way, a textured surface may also rub off or reduce soot deposits collected one or more of the textured surfaces on one or more of the sliding surfaces (e.g., sliding surface 312 of stationary vane 310 and sliding surface 322 of sliding vane 320).

In another embodiment, sticking of the moving sliding vane 320 may be reduced by increasing a clearance distance between nozzle wall plate 250 and each nozzle vane 260 during certain engine operating conditions in an engine having a swing nozzle vane turbine and/or SSVNT. The increased clearance distance may be achieved via implementation of an actuation block, the actuation block having a substantially rhomboid-shape and/or parallelogram-shaped cross-section. In one example, the actuation block may be coupled to the actuation pin 324 of sliding vane 320.

As such, the actuation block may be configured to produce a transverse force or pressure on a location of the actuation pin 324 opposite the sliding vane 320, as described below in reference to FIGS. 9-11. In other examples, other suitable actuator(s) (e.g., an actuation yoke) may be employed to apply a force to nozzle vane 260 and enable nozzle vane 260 to move along central axis 230. As a result, a plurality of nozzle vanes 260 may be moved away from the surface 252 of nozzle wall plate 250 during one or more engine operating conditions. In this way, sticking of the nozzle vanes 260 to surface 252 may be reduced during engine operating conditions that may be prone to vane sticking, e.g., during high engine temperatures and/or high engine load.

Figure 5:
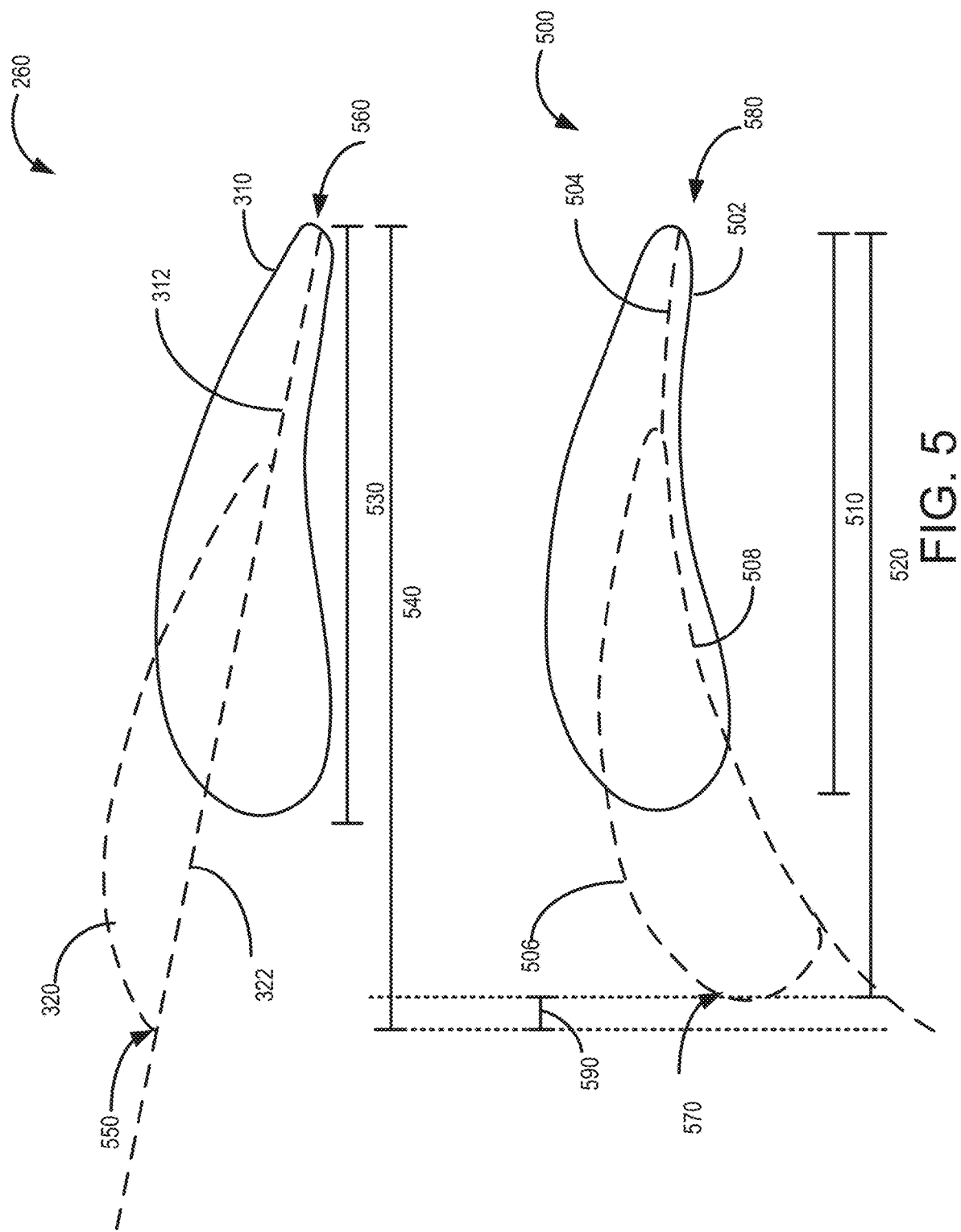
FIG. 5 shows a first example nozzle vane having planar sliding surfaces and a second example nozzle vane have cambered sliding surfaces.

Turning now to FIG. 5, at the top is a schematic illustration of nozzle vane 260 having planar sliding surfaces 312 and 322, as referenced in FIG. 3 above. At the bottom of FIG. 5 is a schematic illustration of a nozzle vane 500 comprising a stationary vane 502 and sliding vane 506, wherein the stationary vane 502 has a cambered sliding surface 504, and the sliding vane 506 has a cambered sliding surface 508. In one embodiment, nozzle vane 500 may be included as an alternative to nozzle vane 260 on turbine nozzle 210 having annular nozzle wall plate 250. Sliding vane 320 of nozzle vane 260 may slide in contact with and against stationary vane 310 of nozzle vane 260 along sliding surfaces 312 and 322, as described above in reference to FIG. 3. Similarly, sliding vane 506 may slide in contact with and against stationary vane 502 along sliding surface 504 of stationary vane 502 and sliding surface 508 of sliding vane 506.

Nozzle vane 260 may be adjusted to a minimum length 530, while nozzle vane 500 may be adjusted to a minimum length 510. In one example, when nozzle vane 260 is adjusted to minimum length 530, nozzle vane 260 may be referred to as being in a small vane opening position. Likewise, when nozzle vane 500 is adjusted to minimum length 510, nozzle vane 500 may be referred to as being in the small vane opening position. In one example, minimum lengths 510 and 530 are substantially the same, as minimum lengths 510 and 530 may each reflect a length of the nozzle vane when sliding vane 320 and sliding vane 506 are substantially overlapping their respective stationary vane (e.g., stationary vane 310 along sliding surface 322 for sliding vane 320 of nozzle vane 260, and stationary vane 502 along sliding surface 508 for sliding vane 506 of nozzle vane 500). In this example, a trailing edge 560 of nozzle vane 260 and a trailing edge 580 of nozzle vane 500 may be proximal turbine wheel 220. In other words, nozzle vane 260 and nozzle vane 500 may be adjusted to the minimum length 530 and minimum length 510, respectively, when sliding vane 320 and sliding vane 506 are each adjusted to an end of its range closest to turbine wheel 220. As a result, the small vane opening position of nozzle vane 260 and/or nozzle vane 500 allows for a larger cross-sectional area of inlet passage 204 to the turbine blades 222. In this way, the small vane opening position of nozzle vane 260 and/or nozzle vane 500 may be desirable during low engine load conditions.

In another embodiment, nozzle vane 500 having cambered sliding surface 508 on the sliding vane 506 and cambered sliding surface 504 on the stationary vane 502 may be adjusted to a maximum length 520. Nozzle vane 500 adjusted to the maximum length 520 is shown as dashed lines (bottom of FIG. 5). Likewise, the nozzle vane 260 having planar sliding surface 312 on stationary vane 310 and planar sliding surface 322 on sliding vane 320 may be adjusted to a maximum length 540. Nozzle vane 260 adjusted to the maximum length 540 is shown as dashed lines (top of FIG. 5). Herein, when nozzle vane 260 is adjusted to maximum length 540, nozzle vane 260 may be referred to as being in a large vane opening position. Similarly, when nozzle vane 500 is adjusted to maximum length 520, nozzle vane 500 may be referred to as being in the large vane opening position. In this example, maximum length 520 may be less than maximum length 540, as shown by a distance 590, wherein distance 590 may be the difference in length between maximum length 520 of nozzle vane 500 and maximum length 540 of nozzle vane 260. Consequently, nozzle vane 500 having the shorter maximum length 520 as compared to nozzle vane 260 having the longer maximum length 540 may allow for reduced radial displacement when nozzle vane 500 is implemented in a turbocharger, and when sliding vane 506 is substantially extended in its range and a leading edge 570 of the nozzle vane 500 is closest to an outer circumference of the nozzle wall plate 250 of the turbine 16. Consequently, packaging burdens may be reduced.

Said another way, nozzle vane 260 and nozzle vane 500 may each be adjusted to maximum length 540 and maximum length 520, respectively, when sliding vane 320 of nozzle vane 260 and sliding vane 506 of nozzle vane 500 are each adjusted to an end of its range farthest from the turbine blades 222. As a result, the large vane opening position of each of the nozzle vane 260 and/or nozzle vane 500 may allow for a smaller cross-sectional area of the inlet passage 204 to the turbine blades 222. In this way, the large vane opening position of nozzle vane 260 and/or nozzle vane 500 may be desirable during low engine load and low engine speed conditions.

In one embodiment, sliding of the sliding vane from the small vane opening position to the large vane opening position of each of the nozzle vane 260 and nozzle vane 500 may at least partially control an exposure of a flow disrupting feature positioned on or around one or more of the nozzle vanes over various operation conditions, as discussed below with reference to FIGS. 7 and 8. The flow disrupting feature may reduce an intensity of a possible shock wave and excitation on the turbine blades when the cross-sectional area of the inlet passages 204 is reduced, thereby constricting exhaust flow during certain engine operating conditions such as engine braking.

As an example, in the large vane opening position of nozzle vane 500 wherein the sliding vane 506 extends to the maximum length 520 and away from the stationary vane 502, the flow disrupting feature may be uncovered and exposed to exhaust gas flow. Alternatively, in the small vane opening position of nozzle vane 500 wherein the sliding vane 506 is not extended away from the stationary vane 502 and the nozzle vane 500 is at the minimum length 510, the flow disrupting feature may be fully covered by sliding vane 506 such that the flow disrupting feature is not exposed to the exhaust gas flow traveling therethrough. In another example, in the large vane opening position of 260 wherein the sliding vane 320 extends to the maximum length 540 and away from the stationary vane 310, the flow disrupting feature may be uncovered and exposed to exhaust gas flow. Alternatively, in the small vane opening position of nozzle vane 260 wherein the sliding vane 320 is not extended away from the stationary vane 310 and the nozzle vane 260 is at the minimum length 530, the flow disrupting feature may be fully covered by sliding vane 320 such that the flow disrupting feature is not exposed to the exhaust gas flow traveling therethrough.

Further, planar sliding surfaces 312 and 322 of nozzle vane 260 may be substantially tangent to an inner circumference of nozzle wall plate 250. For example, leading edge 550 of sliding vane 320, when adjusted to maximum length 540, may be within zero to sixty degrees (e.g., zero to twenty) relative to tangent of a circumference of nozzle wall plate 250. Similarly, cambered sliding surfaces 504 and 508 of nozzle vane 500 may be substantially tangent to the inner circumference of nozzle wall plate 250. For example, leading edge 570 of sliding vane 506, when adjusted to maximum length 520, may be within zero to sixty degrees (e.g., zero to twenty) relative to tangent of the circumference of nozzle wall plate 250.

In another embodiment, leading edge 570 of sliding vane 506, when adjusted to maximum length 520, may be within zero to fifteen degrees relative to tangent of the circumference of nozzle wall plate 250. Consequently, the leading edge of a nozzle vane having cambered sliding surfaces (e.g., nozzle vane 500) may result a smaller angle relative to the circumference of nozzle wall plate 250 when the nozzle vane 500 is adjusted to maximum length 520. As such, there may be a smaller radial displacement into the inlet passage 204 as compared a nozzle vane having planar sliding surfaces (e.g., nozzle vane 260).

In other words, the leading edge 550 of sliding vane 320, when adjusted to maximum length 540 may reach an outer circumference of the nozzle wall plate, such that the leading edge 550 may intrude into the inlet passages 204. In contrast, the leading edge 570 of sliding vane 506, when adjusted to maximum length 520, may not reach an outer circumference of the nozzle wall plate 250. Thus, intrusion into the inlet passages 204 with the nozzle vane 500 having cambered sliding surfaces 504 and 508 may be reduced. In this way, the cambered sliding surfaces (e.g., sliding surfaces 504 and 508 of nozzle vane 500) may reduce aerodynamic flow losses, thereby increasing the rotative power of the turbine.

Of note, the shape, orientation, direction of vane extension, angle of incidence, and/or any other relevant geometries and parameters of the sliding and stationary surfaces and/or sliding and stationary vanes may vary depending on desired functions in a SSVNT or a conventional swing nozzle vane turbine.

In this way, the nozzle vane 500 having cambered sliding surfaces 504 and 508 may reduce an intrusion of the leading edge 570 of nozzle vane 500 into the inlet passage 204 due to the smaller radial displacement during low engine temperature, low engine speed, and/or low engine load operating conditions. This may result in reduction of sub-optimal angles of incidence for the incoming exhaust gas to the turbine blades 222, and thus, increase turbine efficiency. Further, the smaller radial displacement into the inlet passage 204 of the nozzle vane 500 having cambered sliding surfaces 504 and 508 may reduce a need for an enlarged volute (e.g., turbine housing 202). An enlarged turbine housing 202 may hinder packaging, reduce pulsed flow energy utilization, and increase heat loss and penalties during transient responses and warm-up.

FIG. 6 portrays nozzle vane 500 and dimensions of nozzle vane 500 that may affect aerodynamic properties of turbine nozzle 210. The top illustration of FIG. 6 shows an example embodiment of nozzle vane 500 so that various nozzle vane characteristics may be defined contextually. The bottom illustration of FIG. 6 shows contextually where nozzle vane 500 is positioned on a turbine nozzle 608, as well as other relevant parameters to define the various desirable vane characteristics.

Nozzle vane 500 may include rounded leading edge 570 and the tapered trailing edge 580, as described in reference to FIG. 5. A chord 610 of nozzle vane 500 having a longitudinal length 606 may extend between leading edge 570 and trailing edge 580. A curved or cambered plane 604 may extend between leading edge 570 and trailing edge 580. Plane 604 may be a camber line of the nozzle vane 500. In an example, plane 604 may substantially coincide with sliding surface 504 of stationary vane 502 and sliding surface 508 of sliding vane 506. In one embodiment, chord 610 may form an angle 612 with plane 604 at the interface of sliding surface 504 of stationary vane 502 and sliding surface 508 of sliding vane 506 of nozzle vane 500. In an example, angle 612 may be within ±45 degrees (e.g., within a range of approximately −45 degrees to 45 degrees) with plane 604.

In an embodiment, longitudinal length 606 of chord 610 may comprise a length of 70-90% of half the length R2 of a nozzle outlet radius 660, wherein the length R2 of the nozzle outlet radius 660 may be defined from a centerline of the turbine nozzle to an outer circumference 640 of the nozzle wall plate 250. In another example, plane 604 may be 6 to 7 times greater than half the length of the nozzle outlet radius R2.

In addition, a maximum nozzle thickness 616, herein defined as a height of the thickest part of nozzle vane 500 along a vertical axis (the vertical axis perpendicular to a central axis of the turbine nozzle), may be located at or near (e.g., proximal) the leading edge 570 of nozzle vane 500. In one example, a ratio of the maximum nozzle thickness 616 of the nozzle vane 500 at the leading edge 570 to the length 606 of the chord 610 may be greater than 0.35. It shall be noted that chord 610 having the aforementioned geometries may also apply to a conventional swing nozzle vane turbine with nozzle vanes that pivot or swing to adjust the cross-sectional area of the inlet passage 204.

The aforementioned nozzle vane configurations may reduce the incidence loss at the leading edge 570 of the nozzle vane 500 when the nozzle vane 500 slides to the large vane opening position. In this way, there may be a reduction in aerodynamic performance penalty when nozzle vane 500 is extended to the large vane opening position during low engine load and/or low engine temperature conditions. As such, aerodynamic efficiency may be improved at both small vane opening position and large vane opening position while forced back-responses may be simultaneously lessened.

In sum, the nozzle vane geometry disclosed herein having the ratio of the maximum nozzle thickness 616 to chord length 606 (i.e., a ratio greater than approximately 0.35) may achieve desirable aerodynamic performance with reduced forced response for both swing nozzle vane turbines and SSVNTs. There may also be reductions in the variation of angles of incidence at the leading edges of the nozzle vanes and the flow angles at the trailing edges of the nozzle vanes when the nozzle vanes are adjusted. As a result, turbine aerodynamic efficiency may be increased, which may translate to improvements in fuel economy.

FIG. 7 is an example front view of a turbine wheel, such as turbine wheel 220, surrounded by a plurality of nozzle vanes. The nozzle vanes shown in FIG. 7 may be an alternative embodiment of the nozzle vane 260 described in FIGS. 3-5, and thus are numbered as such. In one embodiment, a nozzle vane having planar sliding surfaces (e.g., nozzle vane 260) may be adjusted to minimum length 530 of FIG. 5. In an alternative embodiment (not shown), a nozzle vane having cambered sliding surfaces (e.g., nozzle vane 500) may be provided instead of the nozzle vane having planar sliding surfaces as shown in FIG. 7. In one example, sliding vane 320 may slide against in and in contact with stationary vane 310 along a plane 706. Plane 706 may substantially coincide with sliding surface 312 of stationary vane 310 and sliding surface 322 of sliding vane 320. Moreover, plane 706 may be substantially tangent to inner circumference 630 of nozzle wall plate 250. When sliding vane 320 is adjusted to an end of its range closest to the outer circumference 640 of nozzle wall plate 250, nozzle vane 260 may be adjusted to maximum length 540.

In the example nozzle vane shown in FIG. 7, nozzle vane 260 may include a first gas surface 710 and a second gas surface 720. Each of gas surface 710 and 720 may direct a flow of exhaust gases towards the turbine blades 222 of turbine wheel 220 of the turbocharger from leading edge 550 towards trailing edge 560. The shape and orientation of the first gas surface 710 of stationary vane 310 and the second gas surface 720 of sliding vane 320 may affect the angle of incidence of gas flowing across turbine blades 222. For example, first gas surface 710 of stationary vane 310 and the second gas surface 720 of sliding vane may be configured such that the gases exit turbine nozzle 210 and flow across the turbine blades 222 at an angle of incidence substantially perpendicular to turbine blades 222 and substantially tangential to the inner circumference 630.

Gas surfaces 710 and 720 may be curved or have other suitable geometries. For example, gas surfaces 710 and 720 may trace an arc with a single axis of curvature. As another example, the gas surfaces 710 and 720 may include a convex and a concave portion as far as the flow passage converges along a flow direction. For example, nozzle vane 260 may be curved wedge shaped with a thick end near leading edge 550 and a narrow end near trailing edge 560.

Further, in an example, stationary vane 310 may be attached to turbine nozzle 210 and the geometry of gas surface 710 may be unchanging when the length of nozzle vane 260 is adjusted. As such, the geometry of leading edge 550 of sliding vane 320 and the geometry of tapered trailing edge 560 of stationary vane 310 may potentially reduce variation in the angle of incidence as nozzle vane 260 is adjusted in length. Thus, gas flowing near gas surface 710 of stationary vane 310 may be guided toward turbine blades 222 with little variation. In this way, turbine efficiency may be increased over a wider range of engine operating conditions.

As shown in FIG. 7, inlet passages 204 through turbine nozzle 210 may be formed between adjacent nozzle vanes 260. For example, inlet passage 204 may be formed between gas surface 710 of stationary vane 310 and gas surface 720 of sliding vane 320 of nozzle vane 260. In another embodiment, inlet passages 204 may be formed between gas surfaces of stationary vane 502 and sliding vane 506 of nozzle vane 500. Gas may be guided by gas surfaces 710 and 720 as gas flows through the passages from leading edge 550 of nozzle vane 260 toward trailing edge 560 of nozzle vane 260. The leading edge 550 of nozzle vane 260 may be positioned to face outer circumference 640 and the trailing edge 560 of nozzle vane 260 may be positioned to face inner circumference 630. By orienting each nozzle vane 260 substantially tangent to inner circumference 630 of nozzle wall plate 250, the inlet passage 204 may be narrowed as gas flows through turbine nozzle 210 from outer circumference 640 to inner circumference 630.

As discussed above, nozzle vane 260 of turbine nozzle 210 may be varied in response to different engine operating conditions. For example, it may be desirable to adjust the amount of boost pressure to the engine during different engine operating conditions. By adjusting the length of sliding nozzle vane 260, the flow of gas through turbine nozzle 210 may be varied and the boost pressure of intake manifold 44 may be adjusted. For example, nozzle vane 260 may be lengthened by moving sliding vane 320 toward inner circumference 630 of nozzle wall plate 250. In this manner, the narrower part of the inlet passage having a width, such as a width 708, between adjacent nozzle vanes, e.g. between gas surfaces 710 and 720, may be further narrowed to a width less than width 708. Thus, the cross-sectional area of the inlet passage 204 may be reduced by increasing the length of nozzle vane 260. In this way, exhaust gases may be accelerated as the gas flows from outer circumference 640 to inner circumference 630. For example, gas may be accelerated as the gas flows through the inlet passage from outer circumference 640 to a narrower point of the inlet passage having a width 708.

However, during certain engine operating conditions, such as exhaust braking (i.e. when the engine is used to slow a vehicle in order to reduce wear on a vehicle's brakes and/or to reduce the amount of heat that may be generated if only the vehicle brakes are used to slow or stop the vehicle), the sliding vane 320 may be extended (and moved away from the stationary vane 310) to the large vane opening position. As a result, the cross-sectional area of inlet passage 204 may decrease and may constrict the exhaust flow. Thus, backpressure in the inlet passage 204 may increase. In response, pistons 36 may be forced to work against the backpressure to expel the combusted gas from the cylinder(s), thus slowing the engine 10 and the vehicle.

Therefore, in some examples, a flow disrupting feature 702 may be included on one or more stationary or sliding surfaces (e.g., surfaces 312, 322, 504 and/or 508) of one or more nozzle vanes 260 (and/or nozzle vanes 500). The flow disrupting feature 702 may reduce an intensity of a possible shock wave and subsequent excitation on turbine blades 222. More specifically, the flow disrupting feature 702 positioned on one or more nozzle vanes may effectively disperse sharp and strong shock waves into weakened shock waves that spread over a finite area during certain operating conditions, such as when the nozzle vane is in the small opening vane position during engine braking. Said another way, the flow disrupting feature 702 may reduce a shock wave that may occur when the exhaust gas passes through constricted inlet passages upstream of the turbine.

In one example, the flow disrupting feature 702 may be on a first sliding surface (e.g., sliding surface 322) of the sliding vane 320, such that when the first sliding surface slides against a second sliding surface (e.g., sliding surface 312) of the stationary vane 310, the flow disrupting feature 702 may be hidden and covered. In another example, the flow disrupting feature 702 may be on the second sliding surface (e.g., sliding surface 312) of the stationary vane 310, such that when the first sliding surface of the sliding vane 320 slides against the second sliding surface of the stationary vane 310, the flow disrupting feature 702 may be hidden and covered. In this way, the flow disrupting feature 702 may be preferentially exposed during one or more desirable conditions. In another embodiment, the flow disrupting feature 702 may be disposed on a wall plate, such as nozzle wall plate 250, as described below with reference to FIG. 8B.

In one embodiment, the flow disrupting feature 702 may be a plurality of flow disrupting features. In other examples, the flow disrupting feature 702 may be arranged on a swing or pivot nozzle vane turbine and/or SSVNT.

In some examples, each flow disrupting feature 702 may occupy all or some portion of the sliding surface of one or more nozzle vanes 260. For example, each flow disrupting feature 702 may occupy approximately 10% to 40% of a surface area of trailing edge 560 or leading edge 550 on a first side (e.g., a side of the nozzle vane facing towards the turbine wheel) or a second side (e.g., a side of the nozzle vane facing towards the turbine housing) of each of the plurality of nozzle vanes 260.

In one embodiment, the flow disrupting feature 702 may include two or more parallel grooves, as shown in FIG. 7. For example, the parallel grooves may have a substantially triangular with a pointed bottom and/or rectangular cross-section with a substantially flat bottom. In another example, the parallel grooves may form a specific angle with a bottom surface (not shown) of the trailing edge 560. For example, the parallel grooves may be substantially parallel with a bottom surface of the trailing edge 560.

Furthermore, in some embodiments, the flow disrupting feature 702 may include dimples (not shown). For example, the flow disrupting feature 702 may include one or more substantially round dimples and/or substantially rectangular dimples. In yet another example, the flow disrupting feature 702 may form angled or straight valleys (not shown). In yet another example, the flow disrupting feature 702 may include a combination of grooves and dimples, or may include other shapes including, for example, holes, or bumps, and the like, and/or various combinations of various features of different shapes. The patterns formed on the nozzle vanes 260 may be substantially similar in size, orientation and shape amongst the plurality of flow disrupting features 702. The flow disrupting feature 702 may be arranged parallel and/or perpendicular to the edges of the nozzle vane, or may be arranged at an angle. In addition, the flow disrupting feature 702 may be located substantially adjacent to a first side (not shown) of each of the plurality of nozzle vanes, the first side being a side facing the hub of the turbocharger 13. On the other hand, the flow disrupting feature 702 may be located substantially adjacent to a second side (not shown) of each of the plurality of nozzle vanes, the second side being a side facing the shroud of the turbocharger 13.

In one embodiment, the flow disrupting feature 702 may arranged on the surface area of the first side of the sliding vane 320 along the trailing edge 560, as depicted in FIG. 7. Moreover, the flow disrupting feature 702 may be on the sliding surface 322, such that the flow disrupting feature 702 may be preferentially exposed or hidden depending on a position (and corresponding length) of nozzle vane 260. For example, the flow disrupting feature 702 may be fully exposed when the sliding vane 320 is extended away from the stationary vane 310 (e.g., in the large vane opening position). In one embodiment, the large vane opening position may also be referred to as a first position. In yet another example, the flow disrupting feature 702 may be exposed at the large vane opening position in response to engine load being less than a threshold. In this example, the threshold may be an engine load at which engine boost may be desired.

Alternatively, the flow disrupting feature 702 on the sliding surface 322 of sliding vane 320 may be fully covered or hidden by the stationary vane 310 in the small vane opening position, wherein the sliding vane is not extended away from the stationary vane and/or the turbine nozzle may be at the minimum length, as depicted in FIG. 7. The small vane opening position may also be referred to as a second position. As such, the flow disrupting feature 702 may be hidden in the small vane opening position in response to engine load being greater than a threshold.

Further, one or more intermediate positions may be possible such that the sliding vane 320 is partially extended at a location between the first and second position. In an example, in one or more of the intermediate positions, a portion of the flow disrupting feature 702 may be exposed. In this way, it is possible to selectively uncover or hide the flow disrupting feature 702 over a range of engine operating conditions.

For example, as discussed above, during exhaust braking, the nozzle vanes may be in the large vane opening position to constrict a flow of exhaust gases to the turbine wheel 220. That is, the sliding vane 320 is extended away from the stationary vane 310, wherein the trailing edge 560 is proximal and adjacent to the inner circumference 630 of the turbine nozzle 210. During engine braking, the flow disrupting feature 702 may be selectively exposed to the incoming exhaust gases of inlet passage 204. A disruption to the incoming gas flow by the flow disrupting feature 702 may consequently lessen an intensity of shock waves generated between the turbine nozzle 210 and turbine blades 222. In this way, the flow disrupting feature 702 may reduce the risk of cycle fatigue in turbine blades 222.

However, exposure to the flow disrupting feature 702 may reduce aerodynamic performance when a vehicle is in a firing mode, especially at high engine loads when the inlet passage 204 may have a larger cross-sectional area. Therefore, to reduce the aerodynamic flow losses in the small vane opening position, where the sliding vane 320 is not extended away from the stationary vane 310, the flow disrupting feature 702 may be fully and substantially covered by the sliding vane 320. In this way, during certain engine operating conditions, such as engine braking, force response and shock wave induced excitation may be reduced, while desirable aerodynamic features may be maintained when engine braking is not implemented.

Figure 8A:
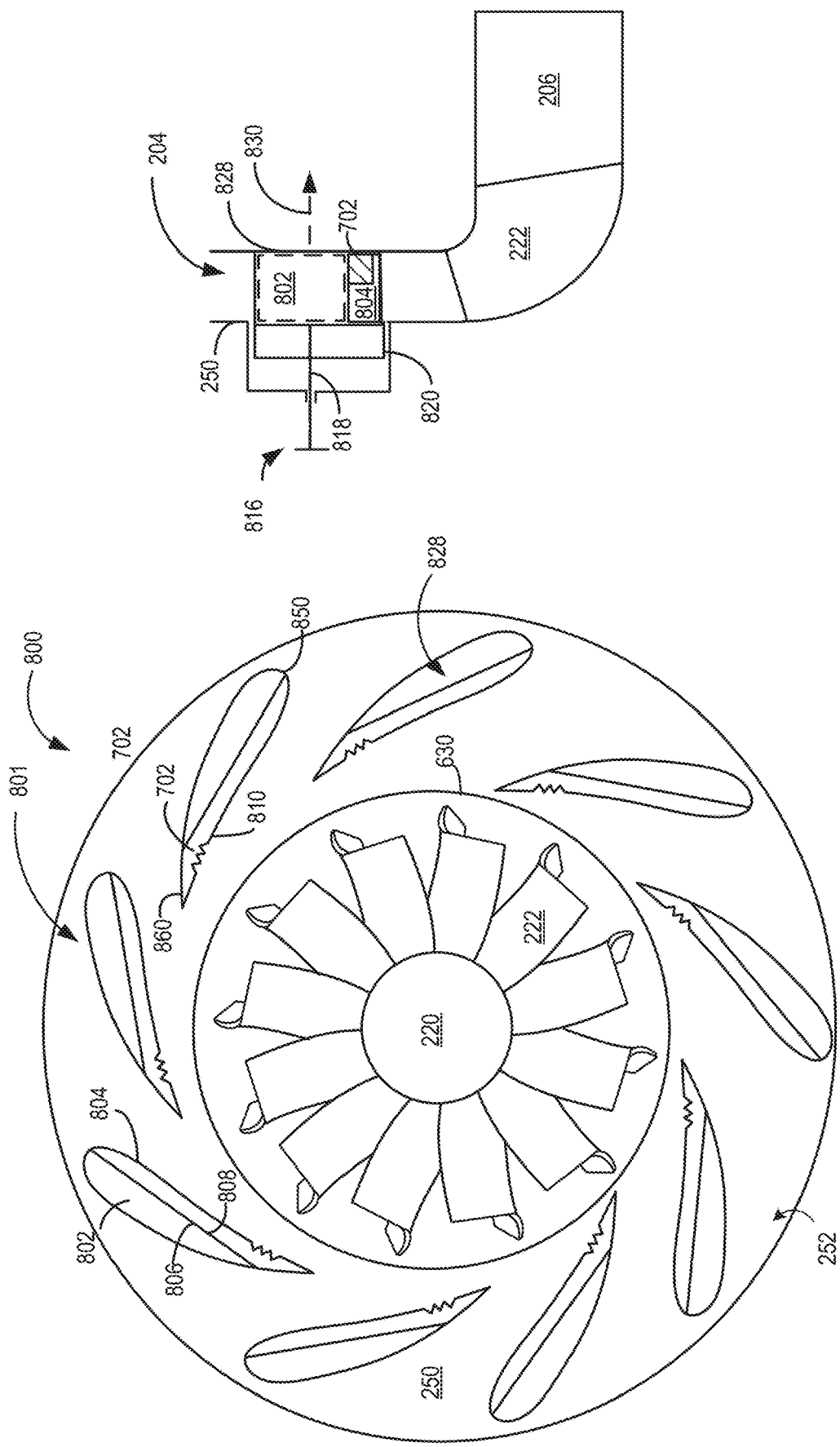
FIGS. 8A-8B illustrate example turbine nozzles having exposable flow disrupting features.

Turning now to FIG. 8A, another example embodiment of the flow disrupting feature 702 of a turbine nozzle 800 (left) and a schematic illustration of a side view of the turbine nozzle 800 (right) is presented. In one embodiment, a nozzle vane 801 may comprise a stationary vane 802 and a sliding vane 804 having planar sliding surfaces 806 and 808, respectively. Stationary vane 802 may include a sliding surface 806 in sliding contact with a sliding surface 808 of sliding vane 804. In one embodiment, sliding surfaces 806 and 808 may be substantially perpendicular to a planar surface 252 of nozzle wall plate 250. For example, the angle between sliding surface 806 and surface 252 may be between eighty and one hundred degrees. In one embodiment, sliding surfaces 806 and 808 may be parallel and planar.

In another embodiment, sliding surface 806 of stationary vane 802 and sliding surface 808 of sliding vane 804 may be cambered (e.g., curved instead of planar) and may be substantially complementary to one another. Thus, the sliding surface 808 of the sliding vane 804 may be convex and the sliding surface 806 of the stationary vane 802 may be correspondingly concave.

The sliding vane 804 may include flow disrupting feature 702, wherein flow disrupting feature 702 may comprise one or more parallel or non-parallel grooves, dimples, and/or valleys. In one example, flow disrupting feature 702 may comprise various cross-sectional shapes, such as triangles, circles and rectangles, and any combination thereof.

In the depicted embodiment, the flow disrupting feature 702 may be on an interior surface 810 proximal a trailing edge 860 of the sliding vane 804, the interior surface 810 facing the turbine blade 222. In another embodiment, the flow disrupting feature 702 may be on the interior surface 810 proximal a leading edge 850 of the sliding vane 804. The flow disrupting feature 702 may comprise 10% to 40% of a surface area or length of the sliding vane 804. In addition, flow disrupting feature 702 may be located substantially adjacent to a first side (not shown), the first side being a side facing the turbine wheel rotor. On the other hand, the flow disrupting feature 702 may be located substantially adjacent to a second side (not shown), the second side being a side facing the shroud of the turbine (e.g., turbine 16).

In one example, the sliding vane 804 may be coupled to a shaft 818, as shown in the schematic illustration at the right in FIG. 8A. The shaft 818 may be coupled to and configured to respond to an actuation mechanism 816, such as an actuation block or actuation arm (e.g., actuation arm 340 of FIG. 3). Actuation mechanism 816 may exert an axially directed force along an axis 830 (e.g., in a direction of the central axis 230 of the turbine nozzle, the central axis 230 the same as the rotational axis of the turbine wheel) on one or more locations of shaft 818. As such, the shaft 818, coupled to sliding vane 804, may move in at least two directions along axis 830 parallel to central axis 230 (e.g., along axis 830 away from nozzle wall plate 250, and/or along axis 830 towards and into nozzle wall plate 250) when the actuating mechanism is maneuvered to apply the axially directed force.

As a result, in contrast to the aforementioned embodiments of the sliding surfaces of FIGS. 3-5, in the current embodiment, the sliding vane 804 may slide in an axial direction along axis 830 on its sliding surface 808 against sliding surface 806 of stationary vane 802. As a result, a length of nozzle vane 801 may be adjusted by moving, e.g. sliding, the sliding vane 804 relative to the stationary vane 802. In this way, the geometry of nozzle vane 801 may be varied such that a cross-sectional area of the inlet passage, or throat, of turbine nozzle 800 may be adjusted, thereby changing the volumetric flow of gas through the inlet passages. In one embodiment, the nozzle wall plate 250 may include one or more wells 820 (e.g., recesses), wherein each well 820 may comprise specific dimensions (e.g., shape and size) to substantially house and envelop sliding vane 804 on at least three sides of sliding vane 804. The wells 820 may be arranged in nozzle wall plate 250 to house at least one sliding vane 804, such that each well 820 may correspond in position to each sliding vane 804 of turbine nozzle 800. For example, as shown in FIG. 8A (right), well 820 may be positioned in wall plate 250 directly behind sliding vane 804 along axis 830. As such, moving sliding vane 804 axially along axis 830 via actuation of shaft 818 may cause sliding vane 804 to either slide out and away from or towards and into nozzle wall plate 250. In another example, wells 820 may correspond in arrangement to one or more slots 330 of unison ring 240 (shown in FIGS. 3 and 4). As such, when the sliding vane is substantially retreated (e.g., recessed) into well 820 of nozzle wall plate 250, well 820 housing sliding vane 804 may be relatively flush with the flat surface 252 of the wall plate 250.

During a first condition, sliding vane 804 may slide along axis 830 out and away from well 820. In other words, sliding vane 804 may slide away from nozzle wall plate 250. When the sliding vane 804 is moved out of well 820, sliding vane 804 may align parallel to axis 830 (e.g., in a direction of the central axis 230 of the turbine nozzle, the central axis 230 the same as the rotational axis of the turbine wheel) and along a vertical axis with stationary vane 802. As such, sliding surface 808 of sliding vane 804 may slide against sliding surface 806 of stationary vane 802. In this example, the sliding vane 804 may slide axially to a position, wherein the sliding vane 804 may abut against and may be substantially flush with a front-facing surface 828 of stationary vane 802. In one example, the front-facing surface 828 of stationary vane 802 may face the shroud side of the turbocharger.

In one embodiment, the first condition may include lower exhaust gas flow conditions, such as low engine load and low engine speed. Thus, an amount of exhaust gas flow into the turbine volute may be less than higher exhaust gas flow conditions (e.g., high engine load, high engine speed, and/or during engine braking). Thus, nozzle vane 801 may be in the large vane opening position, wherein sliding vane 804 may be out of and away from well 820. Moreover, sliding surface 806 of abut against sliding surface 808 of stationary vane 802. Thus, the cross-sectional area of a throat area of the inlet passage 204 may be smaller as compared to a cross-sectional area of the throat area of the inlet passage 204 when the nozzle vane 801 is in the small vane opening position.

In one embodiment, flow disrupting feature 702 may be exposed at the large vane opening position during the first condition in response to engine load less than a threshold load. In this way, during the first condition, the flow disrupting feature 702 on the interior surface 810 of sliding vane 804 may be substantially exposed to exhaust gas flow in inlet passage 204. Thus, the gas flow may contact and be disrupted by the flow disrupting feature 702, thereby reducing force response and shock wave induced excitation during engine braking, for example. Said another way, the flow disrupting feature 702 may effectively disperse a sudden and strong shock wave into a weakened shock wave. Consequently, an intensity of a shock wave produced during exhaust braking may be reduced on turbine blades 222, thereby reducing damage to turbine blades 222.

During a second condition, sliding vane 804 may slide along axis 830 into well 820. In other words, sliding vane 804 may travel towards and into nozzle wall plate 250. In one example, when sliding vane 804 is housed or enveloped within well 820, sliding vane 804 may be substantially hidden such that little to no portion of the sliding vane 804 and/or the flow disrupting feature 702 may intrude into a portion of inlet passage 204. In one embodiment, the second condition may include high exhaust flow conditions, including high engine load and/or high engine speed. In other words, during high exhaust flow conditions, the amount of exhaust gas flow into the turbine volute or housing (e.g., housing 202) may be greater than lower exhaust gas flow conditions (e.g., low engine load and/or low engine speed). Thus, nozzle vane 801 may be in the small vane opening position, wherein sliding vane 804 may be enveloped or housed on at least three sides within well 820. Thus, the cross-sectional area of a throat area of the inlet passage 204 may be larger as compared to a cross-sectional area of the throat area of the inlet passage 204 when the nozzle vane 801 is in the large vane opening position.

High flow conditions may also include a condition wherein engine load is greater than the threshold load. For example, the threshold load may be an engine load at which engine boost may be desired. In this way, the flow disrupting feature 702 on the interior surface 810 of sliding vane 804 may be unexposed or hidden, so that the exhaust gas flow may travel to turbine wheel 220 without disruption by interaction with flow disrupting feature 702. In other words, sliding vanes 804 may axially retreat into the wells 820 of nozzle wall plate 250 to avoid efficiency penalty due to the flow disrupting feature 702 during high exhaust flow conditions.

Figure 8B:
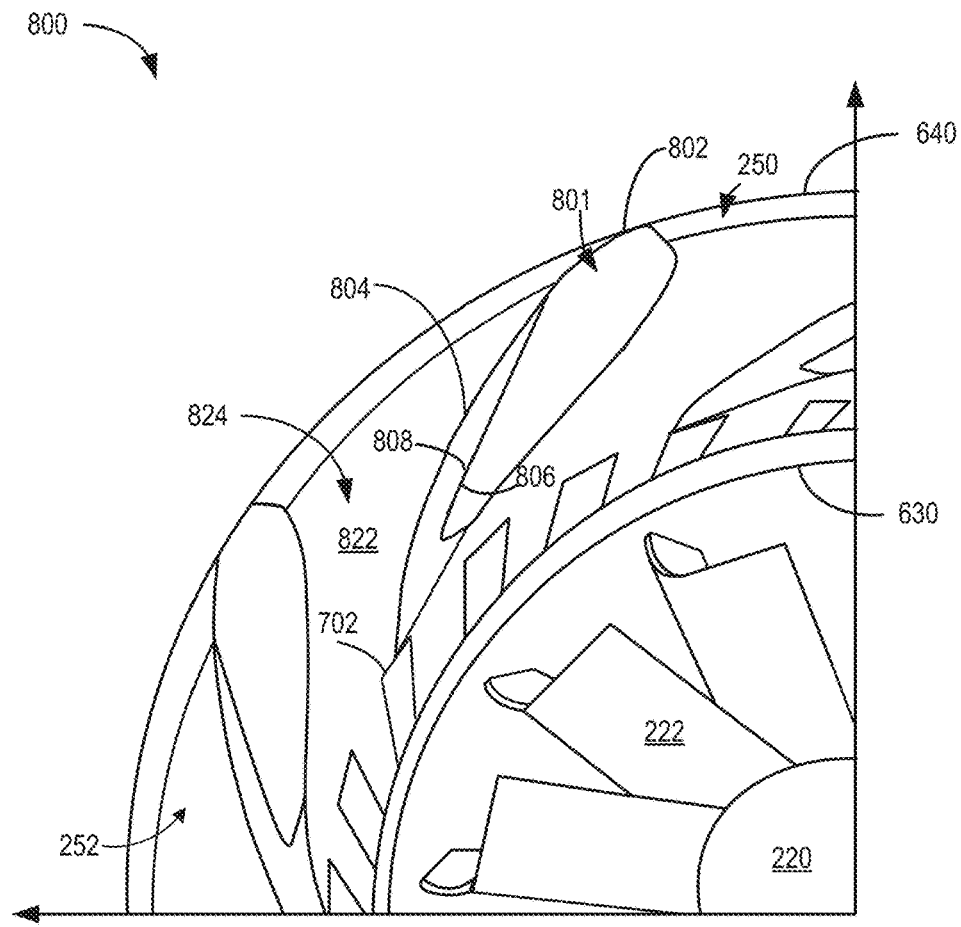
Figure 8B:
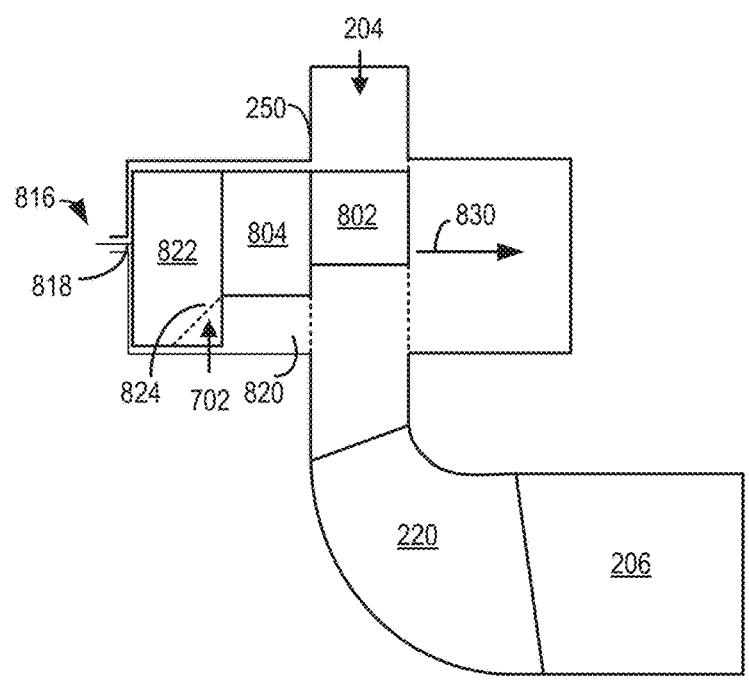

Now turning to FIG. 8B, a cut-out front perspective view of another embodiment of turbine nozzle 800 (top) and a schematic illustration of a top view of the turbine nozzle 800 (bottom) are shown. In one embodiment, an example nozzle vane, e.g., nozzle vane 801, may comprise stationary vane 802 and sliding vane 804 having planar sliding surfaces 806 and 808, respectively. In other embodiments, sliding surfaces 806 and 808 may be cambered. In yet other embodiments, the sliding surfaces 806 and 808 may be a combination of planar and/or cambered surfaces having various angles, as depicted in FIG. 8B. In one example, sliding vane 804 may be configured to move while stationary vane 802 may be immovably attached to or integral to the annular nozzle wall plate 250.

In one embodiment, sliding vane 804 may be coupled to a nozzle wall piece 822. In one example, nozzle wall piece 822 may be coupled to nozzle wall plate 250, such that wall piece 822 may be in direct touching contact with an interior surface (not shown) of nozzle wall plate 250.

A first surface (not shown) of the sliding vane 804 may be integrally attached to a face-sharing, second surface (not shown) of the wall piece 822. In this way, movement of the wall piece 822 may simultaneously move sliding vane 804. Similarly, adjustments to sliding vane 804 may move concomitantly move the wall piece 822. In one example, wall piece 822 may have a surface area on the second surface substantially similar to a surface area of the first surface of the sliding vane 804, as depicted in the lower schematic illustration of FIG. 8B. In yet another example, sliding vane 804 may be reversibly coupled to wall piece 822, such that each sliding vane 804 and/or wall piece 822 may be independently adjusted or actuated.

In one embodiment, the wall piece 822 may include one or more flow disrupting features 702 on an interior surface 824 of wall piece 822. In this example, the flow disrupting feature 702 may be proximal and adjacent to the inner circumference 630 of wall piece 822. In another example, the flow disrupting feature 702 may be disposed at another location on the wall piece 822, such as at a distance between the inner circumference 630 and outer circumference 640. In some embodiments, flow disrupting feature 702 may include one or more parallel or non-parallel grooves, dimples, and/or valleys. In other embodiments, flow disrupting feature 702 may comprise various cross-sectional shapes, such as triangles, circles and/or rectangles, and any combination thereof.

As discussed above in reference to FIG. 8A, at least one of the sliding vanes 804 and/or wall piece 822 may be coupled to and configured to respond to shaft 818, as shown in FIG. 8B (bottom). Further, shaft 818 may be coupled to and configured to respond to actuation mechanism 816, such as an actuation block or actuation arm (e.g., actuation arm 340 of FIG. 3). The actuation mechanism 816 may exert an axially directed force on one or more locations of shaft 818. As such, the shaft 818, coupled to sliding vane 804 and/or the wall piece 822, may move in at least two directions along axis 830 (e.g., along axis 830 away from nozzle wall plate 250, and/or along axis 830 towards and into nozzle wall plate 250) when the actuating mechanism is maneuvered to apply the axially directed force.

As shown in the lower schematic illustration of FIG. 8B, the nozzle wall plate 250 may include one or more wells 820, wherein each well 820 may comprise specific dimensions (e.g., shape and size) to substantially house and envelop one or more sliding vanes 804 and/or wall piece 822. In one example, well 820 may comprise a generally annular shape. Well 820 may be positioned within turbine nozzle 800 to house at least one sliding vane 804 and/or wall piece 822, such that at least one sliding vane 804 and/or wall piece 822 may be enclosed by well 820 on at least three sides when at least one sliding vane 804 and/or wall piece 822 are axially moved into well 820 in nozzle wall plate 250.

Said another way, well 820 may be positioned within nozzle wall plate 250 directly behind sliding vane 804 and/or the wall piece 822 along axis 830, such that moving sliding vane 804 and/or wall piece 822 via shaft 818 in an axial direction (e.g., along axis 830) may cause sliding vane 804 and/or the wall piece 822 to either slide out from or towards into well 820 of nozzle wall plate 250. As such, when sliding vane 804 and/or the wall piece 822 substantially retreats into well 820 of nozzle wall plate 250, sliding vane 804 and/or the wall piece 822 may be relatively flush with a flat surface (e.g., surface 252) of nozzle wall plate 250.

During various operating conditions, an axial movement of one or more sliding vane 804 and/or the wall piece 822 may be adjusted. In this way, it is possible to preferentially expose and/or hide the flow disrupting feature 702 on the wall piece 822 over a range of different operating conditions.

For example, during a first condition, sliding vane 804 and/or wall piece 822 may slide along axis 830 out and away from well 820. In other words, sliding vane 804 and/or wall piece 822 may slide away from nozzle wall plate 250. When sliding vane 804 and/or wall piece 822 move away and out of well 820, sliding vane 804 and/or wall piece 822 may align parallel to axis 830 (e.g., in a direction of the central axis 230 of the turbine nozzle, the central axis 230 the same as the rotational axis of the turbine wheel) and along a vertical axis with stationary vane 802. Thus, nozzle vane 801 may be in the large vane opening position, wherein sliding vane 804 may slide out and away from well 820 and abut against sliding surface 808 of stationary vane 802. In other words, sliding surface 808 of sliding vane 804 may slide against sliding surface 806 of stationary vane 802. As a result, the cross-sectional area of a throat area of inlet passage 204 may be smaller as compared to a cross-sectional area of the throat area of inlet passage 204 when the nozzle vane 801 is in the small vane opening position.

In one example, the first condition may include lower exhaust gas flow conditions, such as during low engine load and low engine speed. Thus, an amount of exhaust gas flow into the turbine volute or housing (e.g., housing 202) may be less than higher exhaust gas flow conditions (e.g., high engine load, high engine speed, and/or during engine braking). In another example, the first condition may include engine braking. Therefore, the larger vane opening position of nozzle vane 801 may allow more rapid flow of lower speed exhaust flow during the first condition.

In the depicted embodiment, flow disrupting features 702 may be exposed at the large vane opening position during the first condition in response to engine load being less than a threshold load. As such, during the first condition, the flow disrupting feature 702 circumferentially disposed around wall piece 822 may be substantially exposed to exhaust gas flow in inlet passage 204. In response, exhaust gas flow may contact and be disrupted by the flow disrupting feature 702, thereby reducing force response and shock wave induced excitation during engine braking, for example. Said another way, the flow disrupting feature 702 may effectively disperse a sudden and strong shock wave into a weakened shock wave when exhaust flow travels through the narrowed inlet passage 204. Consequently, an intensity of a shock wave produced during exhaust braking may be reduced on turbine blades 222, thereby reducing potential damage to turbine blades 222.

During a second condition, sliding vane 804 and/or wall piece 822 may slide along axis 830 into well 820. In other words, sliding vane 804 and/or wall piece 822 may travel towards and into nozzle wall plate 250. In one example, when sliding vane 804 and/or wall piece 822 are each housed or enveloped within well 820, sliding vane 804 and/or wall piece 822 may each be substantially hidden such that little to no portion of the sliding vane 804 and/or wall piece 822 may intrude into a portion of inlet passage 204. Moreover, one or more flow disrupting features 702 on wall piece 822 may also be hidden such that substantially no exhaust gas flow may fluidically contact with one or more flow disrupting features 702.

In one embodiment, the second condition may include high exhaust flow conditions, wherein the amount of exhaust gas flow into the turbine volute or housing (e.g., housing 202) is greater than lower exhaust gas flow conditions (e.g., low engine load and/or low engine speed). Thus, nozzle vane 801 may be in the small vane opening position, wherein sliding vane 804 may be enveloped or housed on at least three sides within well 820. Thus, the cross-sectional area of a throat area of the inlet passage 204 may be larger as compared to a cross-sectional area of the throat area of the inlet passage 204 when the nozzle vane 801 is in the large vane opening position.

In this embodiment, high flow conditions may comprise high load and/or high temperature operating conditions. High flow conditions may also include a condition wherein engine load is greater than a threshold load. For example, the threshold load may be an engine load at which engine boost may be desired. In this way, the flow disrupting feature 702 on wall piece 822 may be unexposed or hidden, so that the exhaust gas flow may travel to turbine wheel 220 without disruption by interaction with flow disrupting feature 702. In other words, sliding vanes 804 may axially retreat into the wells 820 of nozzle wall plate 250 to avoid efficiency penalty due to the flow disrupting feature 702 during high exhaust flow conditions.

During the first and/or second condition, the axial movement of the sliding vane 804 and/or the wall piece 822 may be accomplished in two or more steps. In other embodiments, the axial movement may be achieved in one step.

Thus, in one embodiment, an annular turbine nozzle, comprising a nozzle vane may be provided, the nozzle vane including a stationary vane attached to a surface of a nozzle wall plate and including a first sliding surface, and a sliding vane including a second sliding surface including a flow disrupting feature in contact with the first sliding surface, the sliding vane positioned to slide in a direction from substantially tangent to an inner circumference of the turbine nozzle and selectively uncover the flow disrupting feature.

In one example, the first sliding surface and the second sliding surface may be cambered surfaces. The sliding vane may be positioned to slide along a curved line matching the cambered surfaces of the first sliding surface and the second sliding surface. Thus, the sliding vane may slide on a curved path defined by a curvature of the first sliding surface and the second sliding surface.

The disrupting feature may be a plurality of flow disrupting features each adjacent to a respective trailing edge of a plurality of nozzle vanes. In one example, the flow disrupting feature may include a groove or a dimple. In another example, the flow disrupting feature may include two or more parallel grooves each having a substantially triangular cross section or substantially rectangular cross section. In yet another example, the flow disrupting feature may occupy approximately 10% to 40% of the sliding vane. Further, a ratio of a maximum nozzle thickness of the nozzle vane to a length of a chord of the nozzle vane may be greater than 0.35.

The nozzle vane may be at large vane openings where the sliding vane may be extended and moved away from the stationary vane. In the large vane opening position, the flow disrupting feature may be uncovered and exposed to gas flow. In contrast, the nozzle vane may be at small vane openings where the sliding vane may not not extended away from the stationary vane. In the small vane opening position, the flow disrupting feature may be fully covered by the sliding vane.

In another embodiment, a method may be provided, comprising adjusting a position of a plurality of adjustable vanes radially positioned around a turbine wheel of a variable geometry turbine to a first position exposing a flow disrupting feature on a portion of a surface of each of the plurality of adjustable vanes, and adjusting the position of the plurality of adjustable vanes to a second position covering the flow disrupting feature so that the flow disrupting feature is not exposed to gas flow. The plurality of adjustable vanes may include a stationary vane portion and a sliding vane portion, and the flow disrupting feature may be on a first sliding surface of the sliding vane. The first sliding surface may slide against a second sliding surface of the stationary vane. Further, the first sliding surface and the second sliding surface may be curved surfaces and the first sliding surface may slide against the second sliding surface along a curved path defined by the curved surfaces.

In one example, adjusting the position of the plurality of adjustable vanes to the first position may include adjusting the position of the plurality of adjustable vanes to the first position in response to engine load less than a threshold load. In another example, the adjusting the position of the plurality of adjustable vanes to the second position may include adjusting the position of the plurality of adjustable vanes to the second position in response to engine load greater than a threshold load.

Figure 9:
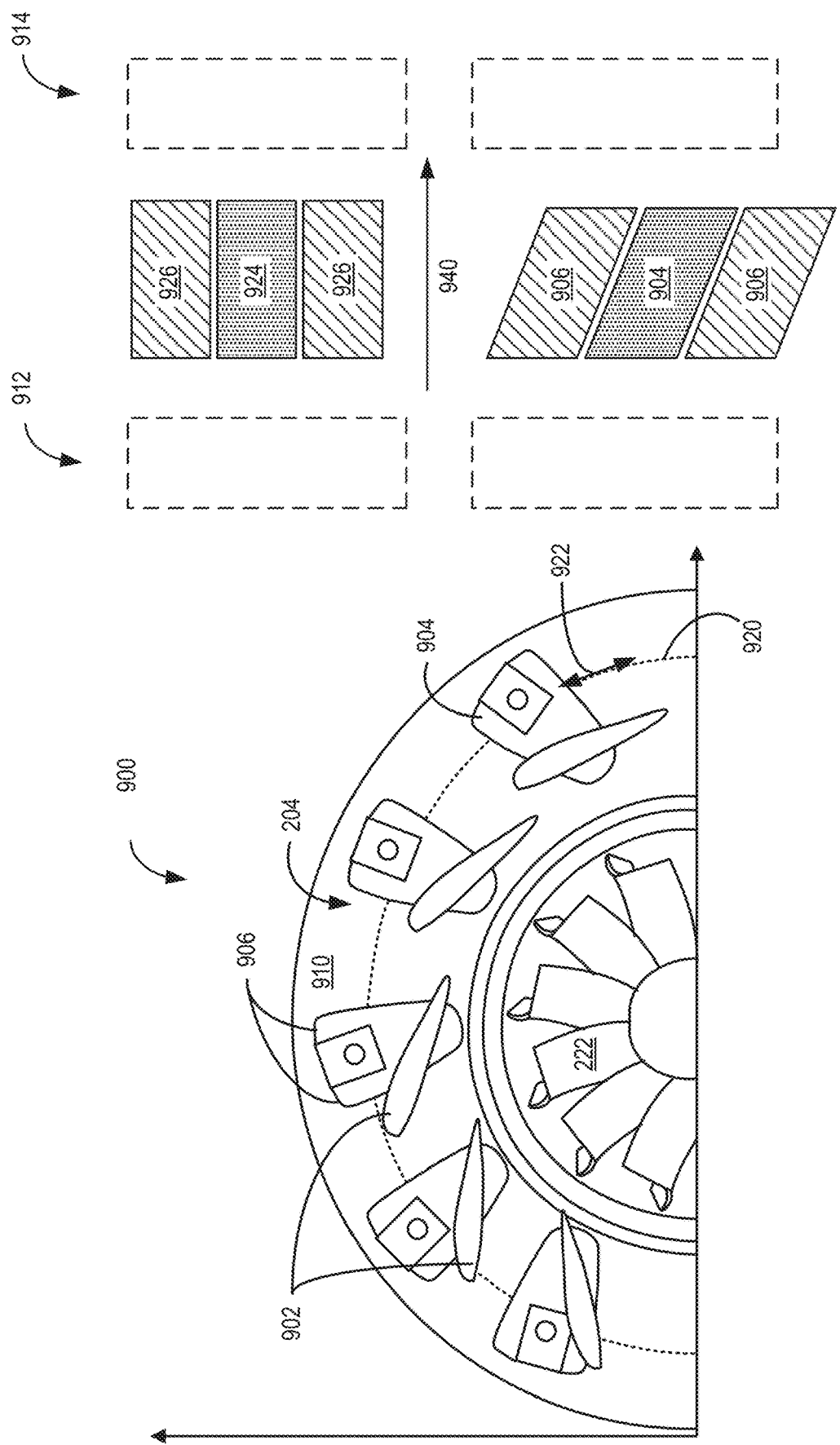
FIG. 9 shows a schematic illustration of a turbine nozzle for a swing vane turbine nozzle.

Now referring to FIG. 9, a cut-out front view of a swing vane turbine nozzle 900 of a turbocharger (left) and a schematic top-view illustration of an actuation block 904 (right) of the swing vane turbine nozzle 900 are provided. In the swing vane turbine nozzle 900, an array of axially extending nozzle vanes 902 is attached to a nozzle wall 910 so as to extend across one or more inlet passages 204. In one example, nozzle vanes 902 may be positioned between a hub side 912 and a shroud side 914. The hub side 912 may be a side of the turbocharger proximal turbine wheel 220 and turbine rotor, and the shroud side 914 may be a side of the turbocharger proximal turbine housing 202. In another example, the nozzle wall 910 carrying the plurality of nozzle vanes 902 may be at a location substantially at the hub side 912. In other words, the hub side 912 and shroud side 914 are sides relative to the hub of the turbine wheel 220 and the turbine shroud or housing (e.g., turbine housing 202). Specifically, the hub side 912 is closer to the hub of the turbine wheel 220 than the shroud side 914, which is closer to the shroud or housing 202.

In this type of turbine, a size of the inlet passages 204 may be controlled by varying the angle of the nozzle vanes relative to the direction of exhaust gas flow through the inlet passages 204. Reducing the cross-sectional area of one or more inlet passages 204 upstream of the turbine blades 222 maintains a velocity of the gas reaching the turbine 16 at a level which ensures efficient turbine operations during low exhaust gas volume flow.

In one embodiment, one or more nozzle vanes 902 may pivot in a first direction to increase a cross-sectional area of one or more inlet passages 204 upstream of the turbine 16 and may decrease the angle of incidence of gas flowing across the turbine blades 222. Similarly, nozzle vanes 902 may pivot in an opposite, second direction to decrease the cross-sectional area of one or more inlet passages 204 and may thereby increase an angle of incidence of gas flowing across the turbine blade 222.

In one embodiment, a first wall, such as nozzle wall 910, may be stacked on a second wall (not shown) or ring, such as unison ring 240, in an axial direction (e.g., along a central axis 940). In one example, the second wall may be coupled to an actuation arm (for example, actuation arm 340 of FIG. 4) or another suitable actuation mechanism. In this way, the second wall may be rotated via the actuation arm extending in a radial direction from the second wall.

In addition, an actuation block 904 and a yoke 906 may be positioned between the first and second walls, and the actuation block 904 may be coupled to and configured to move with the second wall. Thus, the second wall coupled to the actuation block 904 may rotate via an actuation arm about the central axis 940. As a result, the actuation block 904 may move back and forth in a circumferential direction relative to the central axis 940.

The yoke 906 may be operably coupled to and surround the actuation block 904 on at least two sides of the actuation block 904. In this way, the actuation block 904 may move the yoke 906 when the actuation block 904 is moved via the actuation arm.

In one example, nozzle vanes 902 may be positioned above, relative to the axial direction along axis 940 and in view of FIG. 9, the nozzle wall 910. Further still, a shaft, e.g., a shaft 1004 as shown and described below in reference to FIG. 10, may be operably coupled to the nozzle vane 902 at a first end, wherein the first end may be proximal the shroud side 914. The shaft may traverse the first wall and may also be coupled to the yoke 906 at a second end, wherein the second end may be proximal the hub side 916 as compared to the first side. In one embodiment, the yoke 906 may be configured to rotate the shaft. In response, the rotational movement of the shaft is translated to rotational movement of the nozzle vane 902 coupled to the shaft.

In other words, pivoting or rotating of nozzle vanes 902 may be achieved via the actuation block 904 flanked by yoke 906. Specifically, the actuation block 904, operably coupled to and configured to exert force on yoke 906, may be may be moved via the actuation arm or other appropriate mechanism along a pre-determined path and direction. For example, the actuation block 904 may be moved in a first and/or second direction, depicted by double arrows 922, for a given distance along a path, such as a path 920. In this way, movement of the actuation block 904 causing rotation of the nozzle vane 902 may affect the cross-sectional area of the inlet passage 204 and therefore alter turbine efficiency.

In an embodiment, during a first condition, the actuation block 904 coupled to the nozzle vane 902 (through the yoke 906 and shaft 1004) may be moved circumferentially in a first direction from a first position to a second position. In the second position, the plurality of nozzle vanes 902 may be in a large opening position, wherein each inlet passage 204 upstream of each nozzle vane 902 allows increased exhaust flow to turbine blades 222. Further, movement of actuation block 904 to the second position may move the nozzle vane 902 towards shroud side 914. In one example, the actuation block 904 may be in the second position during high temperature and/or high load when boost in desired.

In another embodiment, during a second condition, the actuation block 904 may be moved back in an opposite, second direction circumferentially from the second position. Moving back in the second direction may rotate the plurality of nozzle vanes to a small opening position to provide smaller inlet passages 204. In this way, the nozzle vanes 902 may constrict a small amount of exhaust gases and increase a velocity of the exhaust gases traveling therethrough to turbine blades 222.

Moreover, an overshoot control (not shown) may be implemented when the actuation block 904 is moved past a specific location in the second direction, such that the actuation block 904 may be moved a third position, as will be discussed in reference to FIGS. 10 and 11. After applying the overshoot control and the actuation block 904 is in the third position, the actuation block 904 may then move back to the first position.

Exhaust flowing through a turbine nozzle having swing-type nozzle vanes (e.g., nozzle vanes 902) may include soot and hydrocarbons that may potentially cause increased resistance, or sticking, when pivoting or rotating the nozzle vane 902, which is especially a concern during conditions of high engine load and/or high temperatures. In an example, one or more nozzle vanes 902 may stick on nozzle wall 910 on hub side 912 more readily than the opposite facing wall of the shroud side 914. Therefore, maximizing a clearance distance between the nozzle vanes 902 and nozzle wall 910 proximal the hub side 912 and/or the shroud side 914 may reduce sticking of the nozzle vanes 902 during high engine load and/or high temperature conditions.

Further, adjustments to the clearance distance on the shroud side 914 and/or the hub side 912 may affect turbine efficiency. For example, a reduction in the clearance distance on the shroud side 914 may improve turbine efficiency at light (e.g., lower) engine load operating conditions while simultaneously increasing the clearance distance at the hub side 912 during high engine load operating conditions. Therefore, the reduction of the clearance distance on the shroud side 914 may also decrease vane sticking. In this way, shifting the plurality of nozzle vanes 902 along axis 940 away from the nozzle wall 910 on the hub side 912 and towards the shroud side 914 may be desirable during both high and low engine load and/or high and low engine temperature conditions. In an example, axis 940 may be substantially orthogonal to the planar axis of the nozzle wall 910 and the circumferential direction of a movement of the actuation block.

In an embodiment depicted at the top right of FIG. 9, an example actuation block 924 may have a square or rectangular-shaped cross-section. Movement of the actuation block 924 by an actuation arm (not shown) may shift the actuation block 924. In response, a yoke 926 operably coupled to actuation block 924 may also shift circumferentially along a path, such as path 920, causing a shaft (not shown) operably coupled to the yoke 926 at a first end and a nozzle vane coupled to the shaft at a second end (not shown) to rotate or pivot. In this example, the yoke 926 may be only move in a circumferential direction and not an axial direction, such as along axis 940. Thus, the square or rectangular-shaped actuation block 924 and its respective rectangular-shaped yokes 926 may not be able to adjust the clearance distance to achieve beneficial nozzle vane configurations.

However, axial movement along axis 940 of the nozzle vanes 902 may be achieved via actuation block 904, as depicted at the bottom right of FIG. 9. In one example, actuation block 904 may have a substantially parallelogram-shaped cross-section and/or be substantially rhomboid in shape. In one example, the actuation block 904 having the rhomboid shape may have angled sides, such that the angles between adjacent sides and/or opposite sides of the actuation block are outside a range of 80-100 degrees. In another example, the angled sides of the actuation block 904 that face the yokes 906 may be substantially angled (e.g., markedly greater than or less than 90 degrees).

As discussed above, in one embodiment, the actuation block 904 may be flanked on two or more sides by yoke 906, wherein the yokes 906 are configured to pivot one or more shafts operably coupled to nozzle vane 902. In an example, one or more surfaces of the yoke 906 may be in face-sharing contact with one or more surfaces of the actuation block 904. In another example, there may be a small space symmetrically spaced between the actuation block 904 and the yokes 906 on one or more sides of the actuation block 904.

In one embodiment, yokes 906 may also have a parallelogram-shaped or rhomboid-shaped cross-section at least at a location adjacent to the actuation block 904. For example, the yoke 906 having the rhomboid shape may have angled sides, such that one or more angles between adjacent sides of the yoke are outside a range of 80-100 degrees. Said another way, angled sides of the yoke 906 that face and are adjacent to the actuation block 904 may be substantially angled (e.g., markedly greater than or less than 90 degrees).

In this way, moving the rhomboid-shaped actuation block 904 in the first direction may move the nozzle vanes in directions along two distinct axes (e.g., along an axis following path 920, and along axis 940). For example, shifting of the rhomboid-shaped actuation block 904 may cause a pivotal movement of the nozzle vanes 902 about a shaft (e.g., shaft 1004 shown in FIG. 10) coupled to the nozzle vane 902. In addition, shifting of the rhomboid-shaped actuation block 904 may result in axial movement along axis 940 to move nozzle vanes 902 substantially towards the shroud side 914. Consequently, the cross-sectional area of the inlet passage 204 may be increases, thereby reducing a risk of nozzle vane sticking during high exhaust flow conditions.

Now turning to FIG. 10, a schematic side view of the actuation block 904 flanked by yoke 906 along the axial direction is shown. The actuation block 904 may be in a first position 1010 (top schematic illustration) and/or a second position 1012 (bottom schematic illustration) along a y-axis 1016. In one example, the actuation block 904 may also be in a third position (not shown), which will be discussed in reference to FIG. 11. Of note, although the first, second and third position are set along the linear y-axis 1016, each position may be positioned circumferentially along an edge of the turbine nozzle such that the movement of the actuation block 904 may be circumferential as well.

In the embodiment shown, the yoke 906 may be coupled to a shaft 1004 of the nozzle vane 902. In one example, the actuation block 904 may be in the first position 1010, wherein the first position 1010 of the actuation block 904 rotates the yoke 906 to swing the nozzle vanes to the small opening position. In other words, the first position may cause the nozzle vanes to be positioned in a way to reduce a cross-sectional area of the inlet passage and thus constrict a flow of exhaust gases to the turbine wheel. In this position, a length of the nozzle vanes (defined from the leading edge to the trailing edge) may be substantially tangent to the central axis 940. The first position may increase the velocity of the gases during low engine load, low engine speed, and/or low engine temperature operating conditions through a smaller cross-sectional area of the inlet passages 204 to the turbine blades.

In another example, the actuation block 904 may be in the second position 1012, wherein the actuation block 904 may move in the first direction (as discussed in reference to FIG. 9) to pivot the plurality of nozzle vanes 902 to the large opening position. As a result, inlet passages 204 may have a larger cross-sectional area to allow a greater amount of exhaust gases to flow to the turbine blades. In one example, the actuation block 904 may be in the second position during high engine load, high engine speed, and/or high engine temperature operating conditions. In the second position, the length of the nozzle vanes may be aligned radially with respect to the central axis 940.

As described briefly above, the actuation block 904 may be coupled to and configured to produce a bias pressure 1005, denoted as an arrow in the bottom schematic illustration of FIG. 10, on one or more locations of one or more yokes 906 when actuation block 904 is moved from the first position 1010 to the second position 1012. The bias pressure 1005 may be produced on a location of yoke 906 adjacent to a corner of the actuation block 904 that is contacted when the actuation block 904 moves in at least one direction.

As such, when the actuation block 904 is in the first position 1010, depicted in the top schematic illustration of FIG. 10, a clearance distance 1006 between the nozzle vane 902 and the nozzle wall 910 of the hub side 912 may be substantially similar to a clearance distance 1008 between the nozzle vane 902 and shroud side 914. However, when the actuation block 904 is moved to the second position 1012 (depicted in the bottom schematic illustration of FIG. 10), the actuation block 904 may produce the bias force or pressure 1005 on an adjacent corner of one of a yoke 906. The bias pressure 1005 experienced by the yoke 906 may cause shaft 1004 of the nozzle vane 902 to move in the axial direction along axis 940.

In one example, all nozzle vanes of the turbine nozzle may move simultaneously along axis 940 to the shroud side 914. As a result, the plurality of nozzle vanes 902 may be moved away from nozzle wall 910 during certain operating conditions. In this way, it is possible to reduce sticking of the nozzle vanes 902 during high engine load, high exhaust flow and/or high engine temperature conditions, while increasing turbine efficiency during low exhaust flow conditions. In sum, an actuation block having a parallelogram-shape and/or rhomboid shape (e.g., actuation block 904) may be provided to control the clearance distance on the shroud side 914, i.e. the distance between nozzle vanes 902 and turbine housing 202, and hub side 912, i.e. the distance between the turbine nozzle vane 902 and the nozzle wall 910.

Turning now to FIG. 11, a method 1100 for controlling the clearance distances of nozzle vane of the turbine nozzle of FIGS. 9 and 10 during a first and a second condition is disclosed. During the first condition, such as during high engine temperature and/or high engine load operating conditions, the plurality of nozzle vanes 902 may swing in a first direction (described as the first direction in reference to FIGS. 9 and 10) in order to allow a larger amount of exhaust gases to flow through to the turbine wheel 220 and turbine blades 222. The first condition may also include a condition when engine load is greater than a threshold load. For example, the threshold load may be an engine load at which engine boost may be desired. Thus, the actuation block 904 may move in the first direction from the first position to the second position. As a result, actuation block 904 may shift yokes 906 to rotate the nozzle vanes 902 to the large opening position. The large opening position of the nozzle vanes may lead to increases in cross-sectional area of one or more inlet passages 204, allowing a larger amount of exhaust gases to rotate turbine wheel 220 and provide increased engine power.

On the other hand, during a second condition, such as during low engine temperature and/or low engine load operating conditions, actuation block 904 may be moved in an opposite, second direction (described as the second direction in reference to FIGS. 9 and 10) relative to the second position, to a third position past the first position to reduce a cross-sectional area of a throat opening of inlet passages 204. As a result, the nozzle vanes 902 may move to the small opening position. The small opening position may allow an increase of the velocity of exhaust gases through the constricted inlet passages 204 to the turbine wheel 220 during low exhaust flow conditions. The second condition may also include a condition when engine load is less than the aforementioned threshold load.

In one embodiment, an overshoot control may be executed when the actuation block 904 is moved past a specific location in the second direction, such that the actuation block 904 may be moved to a third position, such as third position 1014 of FIG. 10. After applying the overshoot control and the actuation block 904 is in the third position, the actuation block 904 may then move back to the first position. The overshoot control may be included in order to maintain the small opening position to constrict exhaust gas flow while producing the bias pressure 1005 on yoke 906 to move the nozzle vanes 902 in the axial direction along axis 940. In this way, during the second condition, the plurality of nozzle vanes may be in the small opening position to increase turbine efficiency while minimizing shroud side clearance to reduce nozzle vane sticking during high engine temperature conditions.

Thus, at 1102, engine operating conditions and/or the position of an actuation block (e.g., actuation block 904) may be determined. For example, engine load, engine speed, boost pressure, intake air mass flow, turbocharger speed, and exhaust temperature may be measured or calculated by a controller, such as controller 12 of FIG. 1. In one example, these conditions may be used to determine if a clearance distance of the nozzle vanes (e.g., nozzle vanes 902) may be adjusted. For example, it may be beneficial for the clearance distance of the nozzle vanes to be moved closer to the shroud side (e.g., shroud side 914) of the turbine (e.g., turbine 16) during high engine temperatures to reduce risk of nozzle vane sticking.

In another example, the position of the actuation block may also be determined at 1102. The actuation block may be in a first position (e.g., first position 1010 of FIG. 10), wherein the first position of the actuation block rotates a yoke (e.g., yoke 906) to swing the nozzle vanes to the small opening position. In other words, the first position may cause the nozzle vanes to be positioned in such a way to constrict a flow of exhaust gases to a turbine wheel (e.g., turbine wheel 220) and turbine blades (e.g., turbine blades 222). As such, the first position may increase a velocity of the exhaust gases during low engine load and/or low engine temperature operating conditions through a smaller opening or cross-sectional area of the inlet passages (e.g., inlet passages 204). In one example, a position sensor (not shown) or another suitable sensing device may determine a position of the actuation block 904.

At 1104, it is confirmed if a first condition, including high exhaust flow, high load and/or high temperature conditions, is present, such that a larger cross-sectional area of the inlet passage(s) for exhaust gas to travel therethrough to the turbine wheel may be desirable. In one example, the first condition includes a condition wherein engine load is greater than a threshold load, such as the threshold load described above in FIGS. 9 and 10. In this example, the threshold load may be an engine load at which engine boost may be desired. If the aforementioned condition(s) are confirmed, a larger amount of exhaust gases may be produced and routed to the turbine wheel.

Thus, at 1106, the actuation block is moved circumferentially in the first direction to a second position (e.g., second position 1012 of FIG. 10). The movement of the actuation block to the second position simultaneously causes the nozzle vanes to pivot to provide a relatively larger inlet passage, and produce a bias pressure, such as the bias pressure 1005 of FIG. 10, to push the nozzle vanes along an axis (e.g., axis 940) at 1108. As described in FIG. 10, the bias pressure is applied in the axial direction such that the nozzle vanes move axially toward the shroud side (e.g. shroud side 914) of the turbine. In other words, moving the rhomboid-shaped actuation block in the first direction shifts the nozzle vanes in two directions, resulting in both a pivotal movement of the nozzle vanes to increase the cross-sectional area of the inlet passage and an axial movement to move the nozzle vanes 902 substantially towards the shroud side 914 to reduce the risk of vane sticking during high flow conditions.

If the first condition at 1104 is not confirmed, then it is determined if a second condition is present at 1110. For example, the second condition may comprise low engine temperature and/or low engine load operating conditions. The second condition may also include a condition when engine load is less than the threshold load. In this example, the threshold load may be an engine load at which engine boost may not be desired. During the second condition, lower exhaust flow may be routed to the turbine, therefore a smaller inlet passages upstream of the turbine is desired to increase a velocity of the exhaust gases to power the turbine wheel. In one example, the actuation block may move back to the first position, wherein the first position of the actuation block rotates the yoke to swing the nozzle vanes to the small opening position. However, in this example, movement of the actuation block back to the first position may not exert the bias pressure on the yoke to enable an axial force upon the shaft (e.g., shaft 1004) due to an orientation and shape of the actuation block. As a result, undesired nozzle vane sticking may occur.

Thus, at 1112, during the second condition, an overshoot control is applied, wherein the actuation block may be moved in the opposite, second direction past the first position to a third position (e.g., third position 1014 of FIG. 10). In one example, the first position may be between the second position and the third position (along the circumferential line of travel of the actuation block). At 1114, in the third position, the plurality of nozzle vanes may pivot into a smaller inlet passage configuration, such as the small opening position. The small opening position may allow an increase of the velocity of exhaust gases through the constricted inlet passages to the turbine wheel.

In one example, after the actuation block is in the third position, the actuation block moves back in the first direction to the first position at 1116. Movement in the first direction back to the first position produces the bias pressure or force on the plurality of shafts to move the nozzle vanes back against the shroud side. Therefore, the movement of the actuation block 904 in the first direction may minimize the clearance distance (e.g., distance 1008 of FIG. 10) at the shroud side. Further, at 1116, the plurality of nozzle vanes may remain in the small opening position.

Thus, a method for a turbine nozzle may be provided, comprising during a first condition, moving an actuation block coupled to a nozzle vane of the turbine nozzle from a first position to a second position to open the nozzle vane and move the nozzle vane against a shroud-side wall of the turbine nozzle, and during a second condition, moving the actuation block from the second position to a third position, the first position between the second position and the third position, and then back to the first position to close the nozzle vane and move the nozzle vane back against the shroud-side wall. In one embodiment, the actuating block may be shaped as a rhomboid. Further, the actuation block may be coupled to the nozzle vane through a pivotable yoke and rotatable shaft, the pivotable yoke surrounding two oppositely facing sides of the actuation block.

In one example, the first condition may include when engine load is greater than a threshold load while the second condition includes when engine load is less than the threshold load. In addition, moving the actuation block may include moving the actuation block in a circumferential direction relative to a central axis of a turbine wheel, the turbine nozzle surrounding the turbine wheel and sharing the central axis with the turbine wheel, and consequentially moving the yoke in the circumferential direction and an axial direction, the axial direction defined in a direction of the central axis.

The technical effect of a method for adjusting a distance between a plurality of nozzle vanes and a shroud side of a turbine may reduce sticking of the nozzle vanes during high engine load and/or high engine temperature conditions, while increasing aerodynamic efficiency of the angle of incidence during low engine load and/or low engine temperature conditions. Further, the disclosed system having cambered sliding surfaces and a desirable ratio of thickness to chord length also provide a reduced radial displacement of a sliding vane when adjusting a throat area (e.g., cross-sectional area of inlet passages) between the sliding and the stationary vanes, as well as increased aerodynamic efficiency due to a desirable angle of incidence. In this way, the cambered sliding surfaces of the nozzle vanes reduce intrusion of the nozzle vanes into turbine housing (e.g., volute) at a leading edge of the sliding nozzle vane, thereby permitting compact packaging in most existing variable geometry turbines.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbine nozzle, comprising:
   during a first condition, moving an actuation block coupled to a nozzle vane of the turbine nozzle from a first position to a second position to open the nozzle vane and move the nozzle vane against a shroud-side wall of the turbine nozzle; and
   during a second condition, moving the actuation block from the second position to a third position, the first position between the second position and the third position, and then back to the first position to close the nozzle vane and move the nozzle vane back against the shroud-side wall.

2. The method of claim 1, wherein the first condition includes when engine load is greater than a threshold load and wherein the second condition includes when engine load is less than the threshold load.

3. The method of claim 1, wherein the actuation block is shaped as a rhomboid.

4. The method of claim 1, wherein the actuation block is coupled to the nozzle vane through a pivotable yoke and rotatable shaft, the pivotable yoke surrounding two oppositely facing sides of the actuation block.

5. The method of claim 4, wherein moving the actuation block includes moving the actuation block in a circumferential direction relative to a central axis of a turbine wheel, the turbine nozzle surrounding the turbine wheel and sharing the central axis with the turbine wheel, and consequentially moving the pivotable yoke in the circumferential direction and an axial direction, the axial direction defined in a direction of the central axis.

* * * * *